US011086634B2

(12) United States Patent
Wang et al.

(10) Patent No.: US 11,086,634 B2
(45) Date of Patent: Aug. 10, 2021

(54) DATA PROCESSING APPARATUS AND METHOD

(71) Applicant: Shanghai Cambricon Information Technology Co., Ltd., Pudong New Area (CN)

(72) Inventors: Zai Wang, Pudong New Area (CN); Xuda Zhou, Pudong New Area (CN); Zidong Du, Pudong New Area (CN); Tianshi Chen, Pudong New Area (CN)

(73) Assignee: Shanghai Cambricon Information Technology Co., Ltd., Pudong New Area (CN)

( * ) Notice: Subject to any disclaimer, the term of this patent is extended or adjusted under 35 U.S.C. 154(b) by 35 days.

(21) Appl. No.: 16/698,993

(22) Filed: Nov. 28, 2019

(65) Prior Publication Data

US 2020/0104207 A1 Apr. 2, 2020

Related U.S. Application Data

(63) Continuation of application No. 16/698,992, filed on Nov. 28, 2019, which is a continuation-in-part of
(Continued)

(30) Foreign Application Priority Data

Jul. 14, 2017 (CN) .......................... 201710578784.X

(51) Int. Cl.
*H03M 13/00* (2006.01)
*G06F 9/38* (2018.01)
(Continued)

(52) U.S. Cl.
CPC ............ *G06F 9/3893* (2013.01); *G06F 3/012* (2013.01); *G06F 3/017* (2013.01); *G06F 9/3004* (2013.01);
(Continued)

(58) Field of Classification Search
CPC .... G06F 9/3893; G06F 9/3004; G06F 9/3836; G06F 9/30047; G06F 9/4881;
(Continued)

(56) References Cited

U.S. PATENT DOCUMENTS 6,311,306 B1 * 10/2001 White ................. H03M 13/256
714/755
9,684,559 B1    6/2017 Tse
(Continued)

FOREIGN PATENT DOCUMENTS

CN      101547144 A      9/2009
CN      102150135 A      8/2011
(Continued)

OTHER PUBLICATIONS

PCT/CN2018/094710—Search Report, dated Oct. 10, 2018, 9 pages.
(Continued)

*Primary Examiner* — Samir W Rizk
(74) *Attorney, Agent, or Firm* — Getech Law LLC; Jun Ye

(57) ABSTRACT

The disclosure provides a data processing device and method. The data processing device may include: a task configuration information storage unit and a task queue configuration unit. The task configuration information storage unit is configured to store configuration information of tasks. The task queue configuration unit is configured to configure a task queue according to the configuration information stored in the task configuration information storage unit. According to the disclosure, a task queue may be configured according to the configuration information.

17 Claims, 16 Drawing Sheets

Related U.S. Application Data application No. PCT/CN2018/094710, filed on Jul. 5, 2018.

(51) Int. Cl.
*G06F 9/30* (2018.01)
*G06F 17/16* (2006.01)
*G06F 3/01* (2006.01)
*G06F 9/48* (2006.01)
*G06F 9/50* (2006.01)
*G06F 9/54* (2006.01)
*G06F 11/07* (2006.01)
*G06F 11/10* (2006.01)
*G06F 11/30* (2006.01)
*G06F 12/0875* (2016.01)
*G06K 9/00* (2006.01)
*G06K 9/62* (2006.01)
*G06N 3/04* (2006.01)
*G06N 3/063* (2006.01)
*G06F 7/57* (2006.01)

(52) U.S. Cl.
CPC ........ *G06F 9/30047* (2013.01); *G06F 9/3836* (2013.01); *G06F 9/4881* (2013.01); *G06F 9/505* (2013.01); *G06F 9/546* (2013.01); *G06F 11/0751* (2013.01); *G06F 11/1004* (2013.01); *G06F 11/1044* (2013.01); *G06F 11/3024* (2013.01); *G06F 11/3058* (2013.01); *G06F 12/0875* (2013.01); *G06F 17/16* (2013.01); *G06K 9/00268* (2013.01); *G06K 9/00302* (2013.01); *G06K 9/6267* (2013.01); *G06N 3/04* (2013.01); *G06N 3/0481* (2013.01); *G06N 3/063* (2013.01); *G06F 7/57* (2013.01); *G06F 2203/011* (2013.01); *G06F 2212/452* (2013.01)

(58) Field of Classification Search
CPC .......... G06F 9/505; G06F 9/546; G06F 17/16; G06F 3/012; G06F 3/017; G06F 11/0761; G06F 11/1004; G06F 11/1044; G06F 11/3024; G06F 11/3068
See application file for complete search history.

(56) References Cited

U.S. PATENT DOCUMENTS

| | | | |
|---|---|---|---|
| 2003/0163777 A1* | 8/2003 | Holt | G06F 11/1004 714/763 |
| 2010/0211851 A1 | 8/2010 | Dixon | |
| 2013/0023387 A1* | 1/2013 | Webb | A63B 21/1627 482/87 |
| 2014/0089699 A1 | 3/2014 | O'Connor | |
| 2014/0143475 A1* | 5/2014 | Kasorla | G11C 16/14 711/103 |
| 2015/0331806 A1* | 11/2015 | Mondal | G06F 12/0246 711/103 |
| 2016/0085469 A1 | 3/2016 | Cherubini et al. | |
| 2016/0275341 A1 | 9/2016 | Li | |
| 2016/0379047 A1 | 12/2016 | Natan | |
| 2018/0205396 A1* | 7/2018 | Ikegawa | G06F 11/1068 |

FOREIGN PATENT DOCUMENTS

| | | |
|---|---|---|
| CN | 102314213 A | 1/2012 |
| CN | 105164756 A | 12/2015 |
| CN | 106201651 A | 12/2016 |
| CN | 106372622 A | 2/2017 |
| CN | 106775977 A | 5/2017 |
| CN | 106991077 A | 7/2017 |
| CN | 106991477 A | 7/2017 |
| CN | 106991478 A | 7/2017 |
| EP | 1953675 A1 | 8/2008 |

OTHER PUBLICATIONS

EP 19218378.8; European Search Report dated Mar. 26, 2020, 11 pages.
EP 19217773.1, European Search Report dated Apr. 22, 2020, 9 pages.
Hoppner Sebastian at al.; "Dynamic voltage and frequency scaling for neuromorphic many-core systems", 2017 IEEE International Symposium on Circuits and Systems (ISCAS), IEEE, May 28, 2017, 4 pages.
Bert Moons et al.: "Trading Computational Accuracy for Energy Through Dynamic-Voltage-Accuracy-Frequency-Scaling", Design, Automation & Test in Europe, European Design and Automation Association, Mar. 27, 2017, 6 pages.
Liu Zhen: "A Model of Facial Expression for 3D Avatar", Faculty of Information Science and Technology, Ningbo University, 315211. China, May 27, 2007, 4 pages.
CN 201710677922.X—First Office Action, dated Apr. 29, 2020, 5 pages. (no English translation).
CN 201710677922.X—Second Office Action, dated Dec. 11, 2020, 10 pages. (no English translation).
CN 201710578784.X—Second Office Action, dated Jul. 17, 2020, 5 pages. (no English translation).
CN 201710578784.X—Third Office Action, dated Oct. 26, 2020, 3 pages. (no English translation).
CN 201710793531.4—Second Office Action, dated Dec. 16, 2019, 10 pages. (no English translation).
CN 201710793531.4—Third Office Action, dated Mar. 3, 2020, 3 pages. (no English translation).
CN 201710910124.7—First Office Action, dated Oct. 28, 2020, 18 pages. (no English translation).
CN 201810616466.2—First Office Action, dated May 20, 2020, 6 pages. (no English translation).
CN 201810616466.2—Second Office Action, dated Dec. 16, 2020, 4 pages. (no English translation).
EP 18828801.3—Communication Pursuant to Rules 70(2) and 70a(2) EPC, dated Feb. 23, 2021, 1 page.
EP 18828801.3—Extended European Search Report, dated Feb. 5, 2021, 8 pages.
EP 19218378.8—Response to the Invitation to File Search Results Pursuant to Rule 70b(1) EPC, filed Jan. 4, 2021, 16 pages.
EP 19218378.8—Notification of EP Publication Number and Information on the Application of Article 67(3) EPC, dated May 7, 2020, 2 pages.
EP 19217773.1—Response to the Invitation to File Search Results Pursuant to Rule 70b(1) EPC, filed Jan. 4, 2021, 16 pages.
EP 19217773.1—Response to the European Search Report and the Invitation According to Rules 70(2) and 70a(2) EPC dated Aug. 6, 2020, filed Dec. 2, 2020, 13 pages.
EP 19217773.1—Notification of EU Publication Number and Information on the Application of Article 67(3) EPC, dated May 7, 2020, 2 pages.
CN201110578784.X, Official Action dated Jan. 3, 2020, 9 pages, No English Translation.
CN201110793531.4, Official Action dated Jun. 4, 2019, 12 pages, No English Translation.

* cited by examiner

DATA PROCESSING APPARATUS AND METHOD

TECHNICAL FIELD

The disclosure relates to a data processing apparatus and method.

BACKGROUND

On a conventional processor chip, a central processing unit (CPU) transmits a launching configuration instruction to an instruction memory of a dedicated processor core to launch the dedicated processor core to complete a task, and the whole task continues to be executed until an end instruction is executed. Such a task launching manner is called common launching. However, such a common launching mode has the following problems. It is difficult to dynamically monitor an execution state of a present task and to schedule the present task.

SUMMARY

Technical Problems to be Solved

In view of this, the disclosure provides a data redundancy device and method to solve the above-mentioned problems of prior art.

Technical Solutions

According to an aspect of the disclosure, a data redundancy method is provided, which may include: dividing data into M importance ranks; extracting important bit of each piece of data in each importance rank; performing data redundancy processing on the important bit, where M is a positive integer.

In some examples, data redundancy processing may include replica redundancy processing and/or error correcting code processing.

In some examples, ECC processing may include cyclic redundancy check (CRC) and/or error checking and correcting (ECC).

In some examples, performing error correcting code processing on the data may include: performing redundancy storage on the data in the CRC manner, when a read operation is executed, reading a stored CRC code, performing a CRC code operation on raw data, and if the two CRC codes are inconsistent, correcting the data according to the stored CRC code, when a write operation is executed, storing both of the raw data and the CRC code of the data.

In some examples, performing error correcting code processing on data may include: performing redundancy storage on the data in a manner of ECC memory, and when the read/write operation is executed, automatically performing ECC processing by the ECC memory.

In some examples, the replica redundancy processing may include simultaneously backuping N replicas, where N is a positive integer greater than or equal to 2.

In some examples, performing replica redundancy processing on the important bits of the data may include: when a read operation is executed, for the important bits, the raw data and N backed-up data which are consistent are simultaneously read, in case of data inconsistency, determining N backed-up data as finally read data, and simultaneously modifying the $(N+1)^{th}$ inconsistent data, when the write operation is executed, simultaneously writing back the important bits to N backed-up addresses, and ensuring that the data in the raw data is consistent with the N backed-up data.

In some examples, dividing the data into the M importance ranks may include dividing the data according to at least one of a size of the data, an absolute value of the data, a type of the data, a read operation frequency of the data, and a write operation frequency of the data.

In some examples, when the data includes neural network parameters, M importance ranks are divided according to absolute values of the neural network parameters, and M+1 threshold values $T_0$, $T_1$, $T_2$, ..., and $T_M$ are set in a descending order, and when an absolute value D of a neural network parameter meets $T_{i-1} > D > T_i$, data corresponding to the neural network parameter is divided into the $i^{th}$ importance rank, where i=1, 2, ..., M, and $T_0$, $T_1$, $T_2$, ..., and $T_M$ are all real numbers and $T_0 > T_1 > T_2 > ... T_M \leq 0$.

In some examples, when the data includes sparse neural network parameters, and the sparse neural network parameters include nonzero parameters and nonzero parameter positions, the nonzero parameter positions are configured as a first importance rank, M−1 importance ranks are divided for the nonzero parameters according to absolute values of the parameters, and M threshold values $T_1, T_2, ...,$ and $T_M$ are set in descending order, and when the absolute value D of the nonzero parameter meets $T_{i-1} > D > T_i$, the data is divided into the $i^{th}$ importance rank, where i=2, 3, ..., and M, and $T_1, T_2, ...,$ and $T_M$ are all real numbers and $T_1 > T_2 > ... > T_M \leq 0$.

In some examples, when the data includes diagram computation application data which may include vertex data and side data, the vertex data is configured as a first importance rank, M−1 importance ranks are divided for the side data according to access frequencies, and M threshold values $T_1$, $T_2, ...,$ and $T_M$ are set in a descending order, and when a access frequency F of side data meets $T_{i-1} > F > T_i$, the side data is divided into the $i^{th}$ importance rank, where i=2, 3, ..., and M, and $T_1, T_2, ...,$ and $T_{M-1}$ are all real numbers and $T_1 > T_2 > ... > T_M \leq 0$.

In some examples, extracting the important bits of each piece of data corresponding to each importance rank may include: if the data is a floating point parameter, setting sign bit and first y bits of an exponent part and a base part as the important bits, where y is a positive integer; and/or if the data is a fixed point parameter, setting sign bit and first z bits of a numerical part as the important bits, where z is a positive integer.

According to another aspect of the disclosure, a data redundancy device is provided, which may include an importance rank dividing unit, an important bit extracting unit, and a data redundancy processing unit. The importance rank dividing unit is configured to divide data into M importance ranks. The important bit extraction unit is configured to extract important bits of each piece of data in each importance rank. The data redundancy processing unit is configured to perform data redundancy processing on the important bits, where M is a positive integer.

In some examples, data redundancy processing may include replica redundancy processing and/or error correcting code processing, and the data redundancy processing unit includes a redundancy storage unit and a read/write control unit, where the redundancy storage unit is configured to store redundant data and the read/write control unit is configured to read and/or write data.

In some examples, ECC processing may include cyclic redundancy check (CRC) and/or error checking and correcting (ECC).

In some examples, performing error correcting code processing on the data may include: performing redundancy storage on the data in the CRC manner, when the read/write control unit performs a read operation, reading a stored CRC code and performing a CRC code computation on raw data, if two CRC codes are inconsistent, correcting the data according to the stored CRC code, and when the read/write control unit performs a write operation, storing both of the raw data and the CRC code of the data.

In some examples, performing error correcting code processing on data may include: performing redundancy storage on the data in a manner of ECC memory, and when the read/write operation is executed, automatically performing ECC processing by the ECC memory.

In some examples, the replica redundancy processing may include simultaneously backuping N replicas, where N is a positive integer greater than or equal to 2.

In some examples, performing replica redundancy processing on the important bits of the data may include: when a read operation is executed, for the important bits, the raw data and N backed-up data which are consistent are simultaneously read, in case of data inconsistency, determining N backed-up data as finally read data, and simultaneously modifying the $(N+1)^{th}$ inconsistent data, when the write operation is executed, simultaneously writing back the important bits to N backed-up addresses, and ensuring that the data in the raw data is consistent with the N backed-up data.

In some examples, dividing the data into the M importance ranks may include dividing the data according to at least one of a size of the data, an absolute value of the data, a type of the data, a read operation frequency of the data, and a write operation frequency of the data.

In some examples, when the data includes neural network parameters, M importance ranks are divided according to absolute values of the neural network parameters, and M+1 threshold values $T_0, T_1, T_2, \ldots$, and $T_M$ are set in a descending order, and when an absolute value D of a neural network parameter meets $T_{i-1}>D>T_i$, data corresponding to the neural network parameter is divided into the $i^{th}$ importance rank, where i=1, 2, . . . , M, and $T_0, T_1, T_2, \ldots$, and $T_M$ are all real numbers and $T_0>T_1>T_2> \ldots T_M \leq 0$.

In some examples, when the data includes sparse neural network parameters, and the sparse neural network parameters include nonzero parameters and nonzero parameter positions, the nonzero parameter positions are configured as a first importance rank, M−1 importance ranks are divided for the nonzero parameters according to absolute values of the parameters, and M threshold values $T_1, T_2, \ldots$, and $T_M$ are set in descending order, and when the absolute value D of the nonzero parameter meets $T_{i-1}>D>T_i$, the data is divided into the $i^{th}$ importance rank, where i=2, 3, . . . , and M, and $T_1, T_2, \ldots$, and $T_M$ are all real numbers and $T_1>T_2> \ldots >T_M \leq 0$.

In some examples, when the data includes diagram computation application data which may include vertex data and side data, the vertex data is configured as a first importance rank, M−1 importance ranks are divided for the side data according to access frequencies, and M threshold values $T_1, T_2, \ldots$, and $T_M$ are set in a descending order, and when a access frequency F of side data meets $T_{i-1}>F>T_i$, the side data is divided into the $i^{th}$ importance rank, where i=2, 3, . . . , and M, and $T_1, T_2, \ldots$, and $T_{M-1}$ are all real numbers and $T_1>T_2> \ldots >T_M \leq 0$.

In some examples, extracting the important bits of each piece of data corresponding to each importance rank may include: if the data is a floating point parameter, setting sign bit and first y bits of an exponent part and a base part as the important bits, where y is a positive integer; and/or if the data is a fixed point parameter, setting sign bit and first z bits of a numerical part as the important bits, where z is a positive integer.

From the technical solutions, it can be seen that the present disclosure may have at least one of the following beneficial effects:

performing selective redundant processing on data may reduce storage overhead and memory access power consumption;

distinguishing importance ranks of data and performing different redundant processing for different important levels of data may ensure security and reliability of stored data, and simultaneously reducing storage capacity occupation and memory access power consumption.

DETAILED DESCRIPTION OF THE EXAMPLES

The disclosure provides a data processing device which, when task information is configured and input therein, completes interaction with an external device, for example, a processor core, to automatically implement execution of a task of the processor core to implement self-launching.

Figure 1:
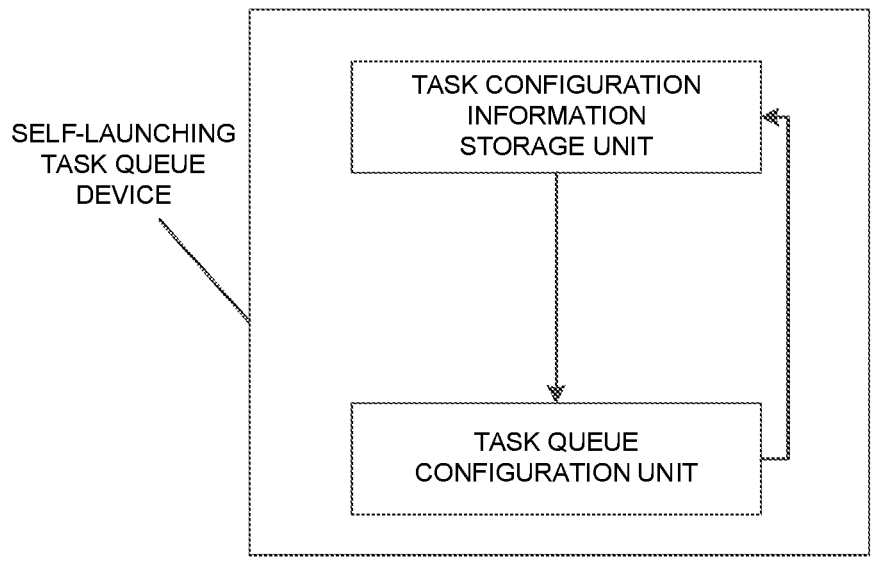
FIG. 1 is a structure diagram of a data processing device according to the disclosure.

As illustrated in FIG. 1, the data processing device may include a self-launching task queue device. As illustrated in FIG. 1, the self-launching task queue device may include a task configuration information storage unit and a task queue configuration unit.

The task configuration information storage unit is configured to store configuration information of tasks. The configuration information may include, but is not limited to, a start tag and an end tag of a task, a priority of the task, a launching manner for the task, and the like.

The task queue configuration unit is configured to configure a task queue according to the configuration information of the task configuration information storage unit and complete dynamic task configuration and external communication.

The self-launching task queue device is configured to cooperate with the external device, receive the configuration information sent by the external device and configure the task queue. The external device executes each task according to the configured task queue. Meanwhile, the self-launching task queue device interacts and communicates with the external device.

Figure 2:
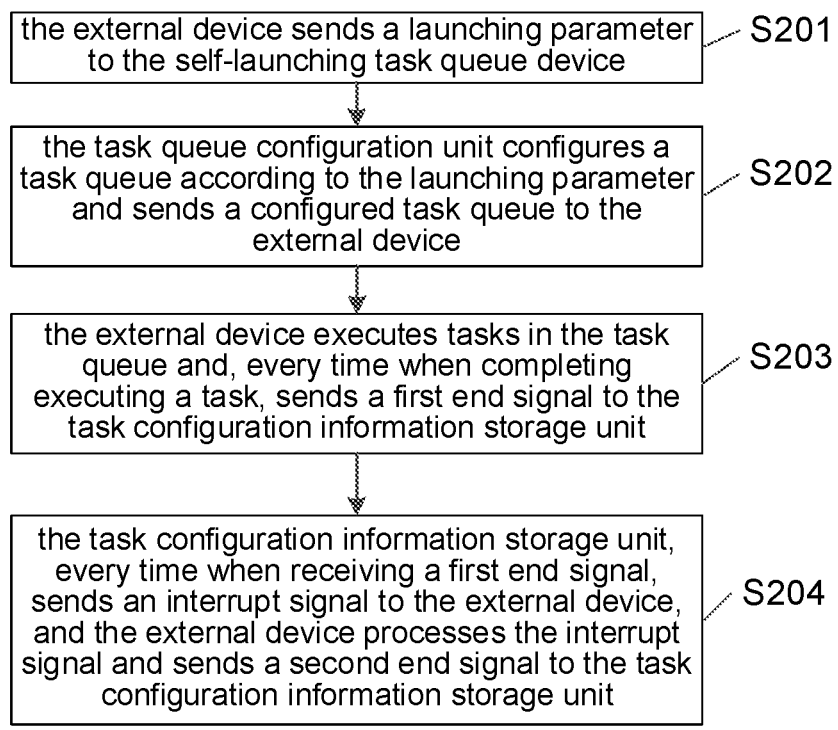
FIG. 2 is a flowchart of a data processing method according to the disclosure.

Referring to FIG. 2, a workflow of the self-launching task queue device is illustrated and, as a data processing method of the disclosure, may include the following steps.

In S201, the external device sends a launching parameter to the self-launching task queue device.

The launching parameter is stored in the task configuration information storage unit of the self-launching task queue device. The launching parameter may include launching information and a launching command. The launching information may be the abovementioned configuration information.

In S202, the task queue configuration unit configures a task queue according to the launching parameter and sends a configured task queue to the external device.

In S203, the external device executes tasks in the task queue and, every time when completing executing a task, sends a first end signal to the task configuration information storage unit.

In S204, the task configuration information storage unit, every time when receiving a first end signal, sends an interrupt signal to the external device, and the external device processes the interrupt signal and sends a second end signal to the task configuration information storage unit.

S203 and S204 are executed for each task in the task queue until all the tasks in the task queue are completed.

The task configuration information storage unit, after receiving the first end signal, may modify the task configuration information stored therein to implement task scheduling.

In order to make the purpose, technical solutions and advantages of the disclosure clearer, the disclosure will further be described below in combination with specific examples and with reference to the drawings in detail.

Figure 3:
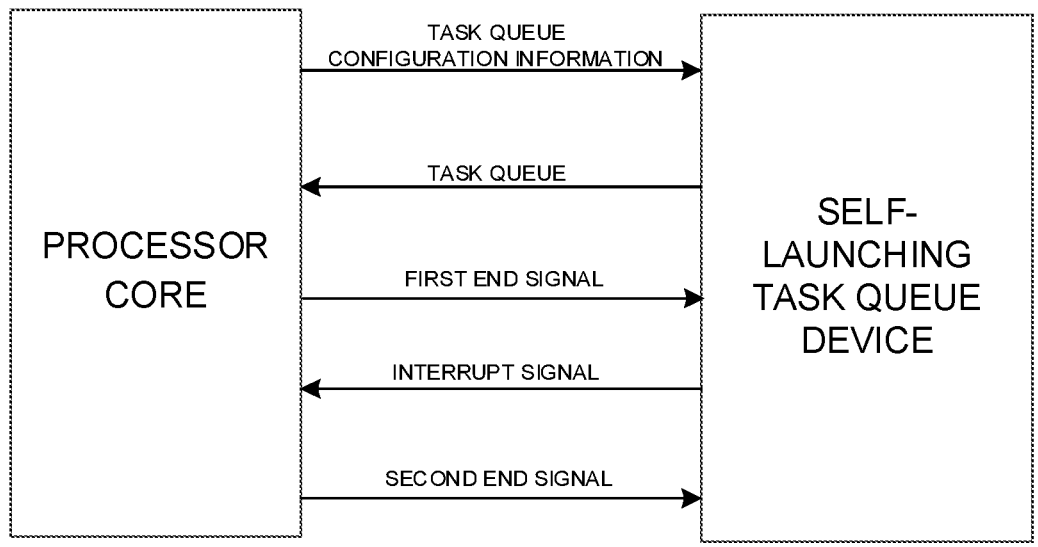
FIG. 3 is a structure diagram of a data processing device according to an example of the disclosure.

An example of the disclosure provides a data processing device. As illustrated in FIG. 3, the data processing device may further include a processor core. The processor core cooperates with the self-launching task queue device as the external device.

The configuration information input into the self-launching task queue device may include a launching mode, priority, and the like of the task. The processor core may execute various types of tasks. The tasks may be divided into different task queues, for example, a high-priority queue and a low-priority queue, according to properties of the tasks and an application scenario. The launching mode of the task may include self-launching and common launching.

Figure 4:
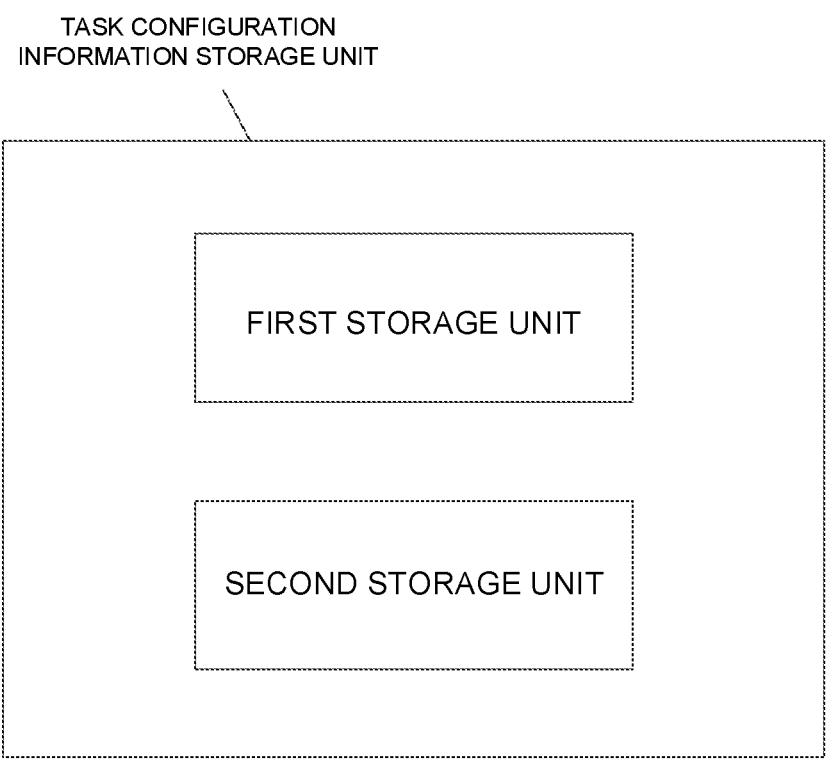
FIG. 4 is a structure diagram of a task configuration information storage unit according to an example of the disclosure.

In the example, referring to FIG. 4, the task configuration information storage unit may include a first storage unit and a second storage unit. The tasks are allocated to the first storage unit or the second storage unit according to the configuration information respectively. The first storage unit stores a high-priority task queue, and the second storage unit stores a low-priority task queue. For the tasks in the task queues, launching and execution of the tasks may be completed according to the respective launching modes.

The above is only exemplary description and not intended to limit the disclosure. In other examples, the task queue may also be configured not according to the priorities but according to other parameters of the tasks, the number of the task queues is also not limited to two and may also be multiple, and correspondingly, there may also be multiple storage units.

Figure 5:
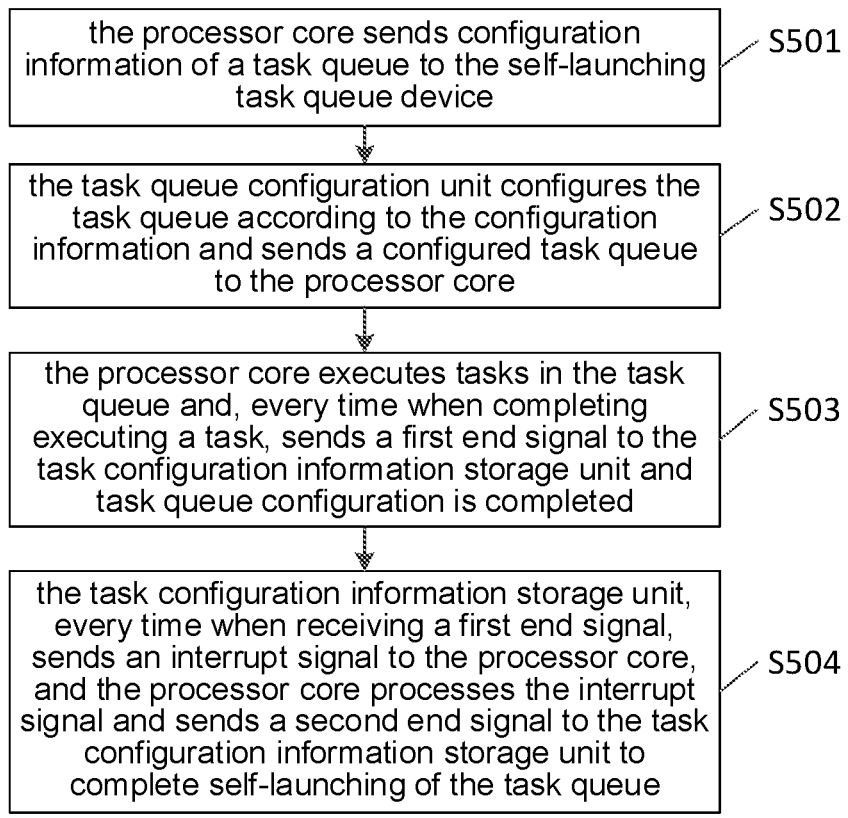
FIG. 5 is a flowchart of a data processing method according to an example of the disclosure.

Referring to FIG. 5, a workflow of the self-launching task queue device of the abovementioned example is illustrated and, as a data processing method of another example of the disclosure, may include the following steps.

In S501, the processor core sends configuration information of a task queue to the self-launching task queue device.

In S502, the task queue configuration unit configures the task queue according to the configuration information and sends a configured task queue to the processor core.

In the S502, the first storage unit sends a stored high-priority task queue to the processor core and the second storage unit sends a stored low-priority task queue to the processor core.

In S503, the processor core executes tasks in the task queue and, every time when completing executing a task, sends a first end signal to the task configuration information storage unit and task queue configuration is completed.

In S504, the task configuration information storage unit, every time when receiving a first end signal, sends an interrupt signal to the processor core, and the processor core processes the interrupt signal and sends a second end signal to the task configuration information storage unit to complete self-launching of the task queue.

In the disclosure, multiple external devices may be provided, for example, multiple processor cores. The processor cores may be various operation modules, control modules, and the like.

In order to achieve a purpose of brief description, descriptions about technical features, which may be applied in a same manner, of a data processing device according to another example of the disclosure refer to those made in the abovementioned example and the same descriptions are not required to be repeated.

Figure 6:
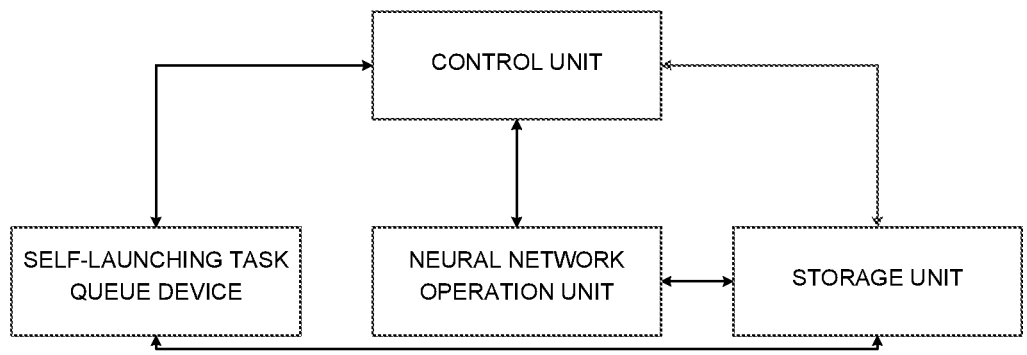
FIG. 6 and FIG. 7 are structure diagrams of a data processing device according to another example of the disclosure.
Figure 7:
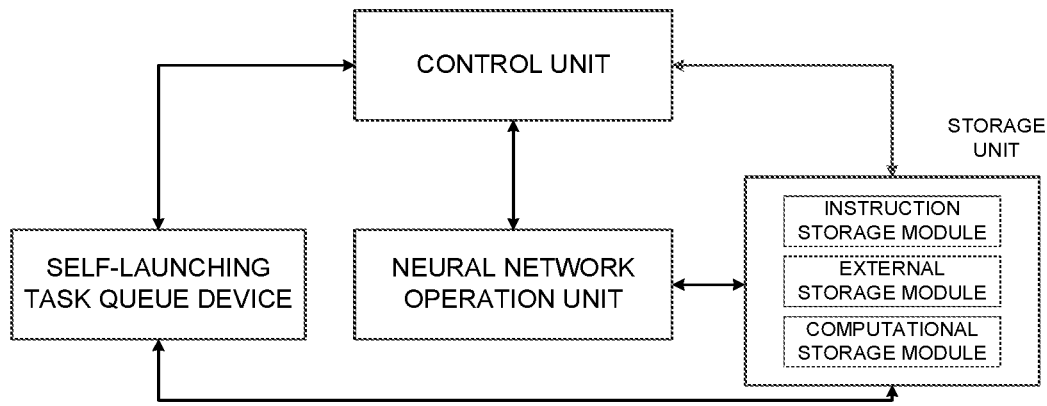

Referring to FIG. 6 and FIG. 7, the processor core of the data processing device may include a control module and a neural network operation module. The neural network operation module may include a control unit, a neural network operation unit, and a storage unit.

The storage unit is configured to store data and instruction for neural network operation. The data may include an input neuron, an output neuron, a weight, a score, an error mode judgment result, and the like. The instruction may include various operation instructions for addition, multiplication, activation, and the like in the neural network operation.

The control unit is configured to control operations of the storage unit and the neural network operation unit.

The neural network operation unit is controlled by the control unit to execute the neural network operation on the data according to an instruction stored in the storage unit.

The control module is configured to provide configuration information of tasks.

Each of the control module and the neural network operation module is equivalent to a processor core. The control module sends configuration information of task queues to the self-launching task queue device. After the self-launching task queue device receives the configuration information, the task queue configuration unit configures the task queues according to the configuration information, stores each task queue in each corresponding storage unit and sends each task queue to the control unit of the neural network operation module. The control unit may monitor a configuration of the self-launching task queue device and configure a neural network operation instruction of the storage unit to a correct position, namely inputting an instruction of an external storage module in the storage unit into an instruction storage module. As illustrated in FIG. 7, the control unit controls the neural network operation unit and the storage unit to execute each task according to the configuration information. The neural network operation unit and the storage unit are required to cooperate to complete a task execution process.

The control unit, every time when completing executing a task, sends a first end signal to the task configuration information storage unit and task queue configuration is completed. The self-launching task queue device, every time when receiving a first end signal of the control unit, modifies the configuration information and sends an interrupt signal to the control unit. The control unit processes the interrupt signal and then sends a second end signal to the self-launching task queue device.

The control unit is usually required to, after being started, send an instruction fetching instruction to complete the operation of configuring the neural network operation instruction of the storage unit to the correct position. That is, the control unit usually may include an instruction fetching instruction cache module. In the disclosure, the control unit is not required to send any instruction fetching instruction. That is, the instruction fetching instruction cache module of the control unit may be eliminated. Therefore, a structure of the device is simplified, cost is reduced and resources are saved.

Figure 8:
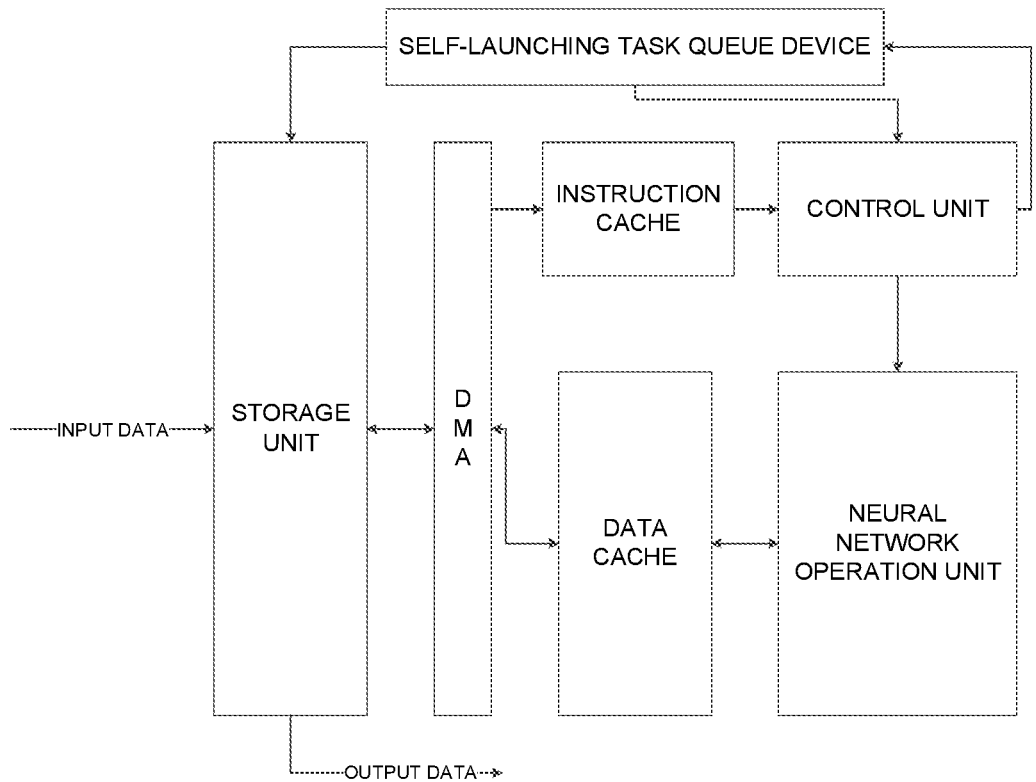
FIG. 8 is a structure diagram of a data processing device according to another example of the disclosure.

Referring to FIG. 8, the data processing device of the example may further include a data cache, an instruction cache, and a DMA. The storage unit is connected with the instruction cache and the data cache through the CMA. The instruction cache is connected with the control unit. The data cache is connected with the operation unit.

The storage unit receives input data and transmits neural network operational data and instruction in the input data to the data cache and the instruction cache through the DMA respectively.

Figure 9:
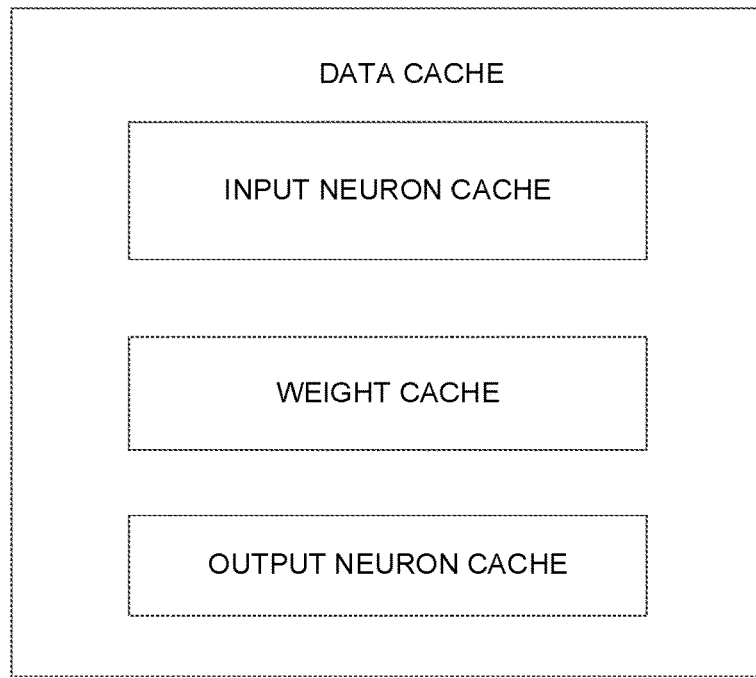
FIG. 9 is a structure diagram of a data cache of a data processing device according to an example of the disclosure.

The data cache is configured to cache the neural network operational data. More specifically, as illustrated in FIG. 9, the data cache may include an input neuron cache, a weight cache, and an output neuron cache configured to cache input neurons, weights, and output neurons sent by the DMA respectively. The data cache may further include a score cache, error mode judgment result cache, and the like configured to cache scores and error mode judgment results and send the data to the operation unit.

The instruction cache is configured to cache the neural network operation instruction. The instructions for addition, multiplication, activation, and the like of the neural network operation are stored in the instruction cache through the DMA.

The control unit is configured to read the neural network operation instruction from the instruction cache, decode it into an instruction executable for the operation unit and send an executable instruction to the operation unit.

The neural network operation unit is configured to execute corresponding neural network operation on the neural network operational data according to the executable instruction. An intermediate result in a computation process and a final result may be cached in the data cache and are stored in the storage unit through the DMA as output data.

Figure 10:
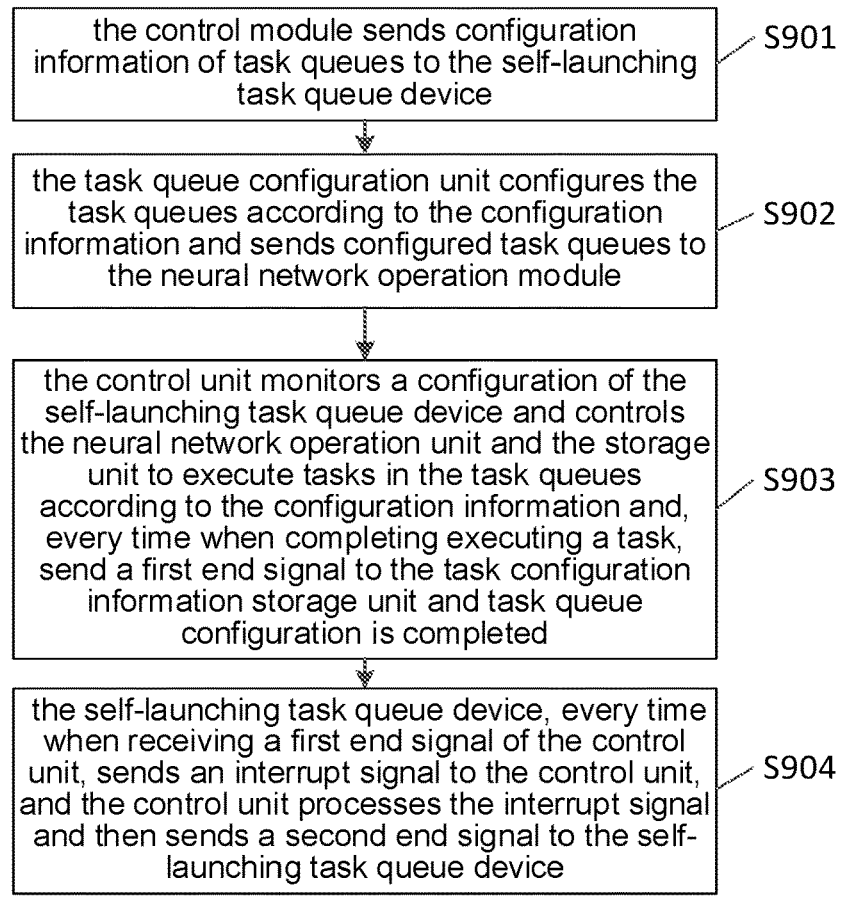
FIG. 10 is a flowchart of a data processing method according to another example of the disclosure.

Referring to FIG. 10, a workflow of the self-launching task queue device of the abovementioned example is illustrated and, as a data processing method of another example of the disclosure, may include the following steps.

In S901, the control module sends configuration information of task queues to the self-launching task queue device.

In S902, the task queue configuration unit configures the task queues according to the configuration information and sends configured task queues to the neural network operation module.

After the self-launching task queue device receives the configuration information, the task queue configuration unit configures the task queues according to the configuration information, stores each task queue in each corresponding storage unit thereof and sends each task queue to the control unit of the neural network operation module.

In S903, the control unit monitors a configuration of the self-launching task queue device and controls the neural network operation unit and the storage unit to execute tasks in the task queues according to the configuration information and, every time when completing executing a task, send a first end signal to the task configuration information storage unit and task queue configuration is completed.

In S904, the self-launching task queue device, every time when receiving a first end signal of the control unit, sends an interrupt signal to the control unit, and the control unit processes the interrupt signal and then sends a second end signal to the self-launching task queue device.

The operation in S903 that the control unit controls the neural network operation unit and the storage unit to execute each task according to the configuration information may include the following steps.

The control unit reads a neural network operation instruction from the storage unit according to the configuration information, and the neural network operation instruction is stored in the instruction cache through the DMA.

The control unit reads the neural network operation instruction from the instruction cache, decodes it into an instruction executable for the operation unit and sends an executable instruction to the operation unit.

The neural network operation unit reads neural network operational data from the data cache, executes corresponding neural network operation on the neural network operational data according to the executable instruction and stores a computational result in the data cache and/or the storage unit.

In the example, the neural network operation may include multiplying an input neuron and a weight vector, adding an offset and performing activation to obtain an output neuron. In an implementation, the neural network operation unit may include one or more computational components. The computational components include, but are not limited to, for example, one or more multipliers, one or more adders and one or more activation function units.

The multiplier multiplies input data 1 ($in_1$) and input data 2 ($in_1$) to obtain output (out), and a process is: out=$in_1$*$in_2$.

As one alternative implementation, the neural network operation unit may include multiple adders and the multiple adders form an adder tree. The adder tree adds the input data ($in_1$) step by step to obtain output data (out), $in_1$ being a vector with a length N and N being greater than one, and a process is: out=$in_1$[1]+$in_1$[2]+ . . . +$in_1$[N]; and/or the input data ($in_1$) is accumulated and then added with the input data ($in_2$) to obtain the output data (out), and a process is: out=in1[1]+in1[2]+ . . . +$in_1$[N]+$in_2$; or the input data ($in_1$) and the input data ($in_2$) are added to obtain the output data (out), and a process is: out=$in_1$+$in_2$.

The activation function unit executes computation on input data (in) through an activation function (active) to obtain activation output data (out), and a process is: out=active(in). The activation function (active) is, but is not limited to, for example, sigmoid, tanh, RELU, and softmax. Besides an activation operation, the activation function unit may further implement other nonlinear computation and may execute computation (f) on the input data (in) to obtain the output data (out), and a process is: out=f(in). The operation unit may also be a pooling unit, and the pooling unit executes pooling computation on the input data (in) to obtain the output data (out) after a pooling operation, and a process is out=pool(in). Pool is the pooling operation; the pooling operation may include, but is not limited to: average pooling, maximum pooling, and median pooling; and the input data in is data in a pooling core related to the output data out.

Correspondingly, the neural network operation may include, but is not limited to, multiplication computation, addition computation, and activation function computation. The multiplication computation refers to multiplying input data 1 and input data 2 to obtain multiplied data. And/or the addition computation is executed to add the input data 1 through the adder tree step by step or accumulate the input data ($in_1$) and then add the input data ($in_2$) or add the input data 1 and the input data 2 to obtain output data. And/or the activation function computation refers to executing computation on the input data through the activation function (active) to obtain the output data. And/or the pooling computation is out=pool(in). Pool is the pooling operation; the pooling operation may include, but is not limited to: average pooling, maximum pooling, and median pooling; and the input data in is data in the pooling core related to the output data out. The one or more of the abovementioned computations may be freely selected for combination in different sequences, thereby implementing computation of various functions.

In another implementation, the neural network operation unit may include, but is not limited to, multiple PEs and one or more ALUs. Each PE may include a multiplier, an adder, a comparator, and a register/register set. Each PE may receive data from the PEs in each direction, for example, receive data from PEs in a horizontal direction (for example, the right) and/or a vertical direction (for example, the lower), and may also transmit data to the PEs in an opposite horizontal direction (for example, the left) and/or an opposite vertical direction (for example, the upper). And/or each PE may receive data from the PEs in a diagonal direction and may also transmit data to the diagonal PEs in the opposite horizontal direction. Each ALU may complete basic computation such as an activation operation, multiplication, addition, and other nonlinear computation.

Correspondingly, the computation executed by the neural network operation unit may include computation executed by the PEs and computation executed by the ALU. The PE multiplies the input data 1 and the input data 2, adds a product and data stored in the register or the data transmitted by the other PEs, writes a result back into the register or a storage part and simultaneously transmits certain input data or a computational result to the other PEs. And/or the PE accumulates or compares the input data 1 and the input data 2 or the data stored in the register. The ALU completes activation computation or nonlinear computation.

When the neural network operation unit executes convolutional computation, fully connected computation, and the like, for each PE, the input data 1 ($in_1$) and the input data 2 ($in_2$) may be multiplied to obtain the multiplied output ($out_1$), and a process is: $out_1$=$in_1$*$in_2$. The data in the register is extracted and accumulated with a multiplication result ($out_1$) to obtain a result ($out_2$): $out_2$=$out_1$+data. $Out_2$ may be written back into the register/register set or the storage part. In addition, certain input data ($in_1$/$in_2$) may be transmitted in the horizontal direction or the vertical direction.

When the neural network operation unit processes a vector dot product, for each PE, the input data 1 ($in_1$) and the input data 2 ($in_2$) may be multiplied to obtain a multiplied output ($out_1$), and the process is: $out_1$=$in_1$*$in_2$. The data transmitted by the other PEs is accumulated with the multiplication result ($out_1$) to obtain the result ($out_2$): $out_2$=$out_1$+data. Then, the computational result ($out_2$) may be transmitted in the horizontal direction or the vertical direction.

When the neural network operation unit executes pooling computation, for each PE, a multiplication part may not be executed, and the adder or the comparator is directly adopted to complete the pooling computation: out=pool(in). Pool is the pooling operation, and the pooling operation may include, but is not limited to, average pooling, maximum pooling, and median pooling. The input data in is data in the pooling core related to an output out, and intermediate temporary data may be stored in the register.

Each ALU is configured to complete basic computation such as an activation operation, multiplication and addition, or nonlinear computation. The activation operation refers to executing computation on the input data (in) through the activation function (active) to obtain the activation output data (out), and the process is: out=active(in). The activation function may be sigmoid, tanh, RELU, softmax, and the like. The other nonlinear computation refers to executing computation (f) on the input data (in) to obtain the output data (out), and the process is: out=f(in).

Figure 11:
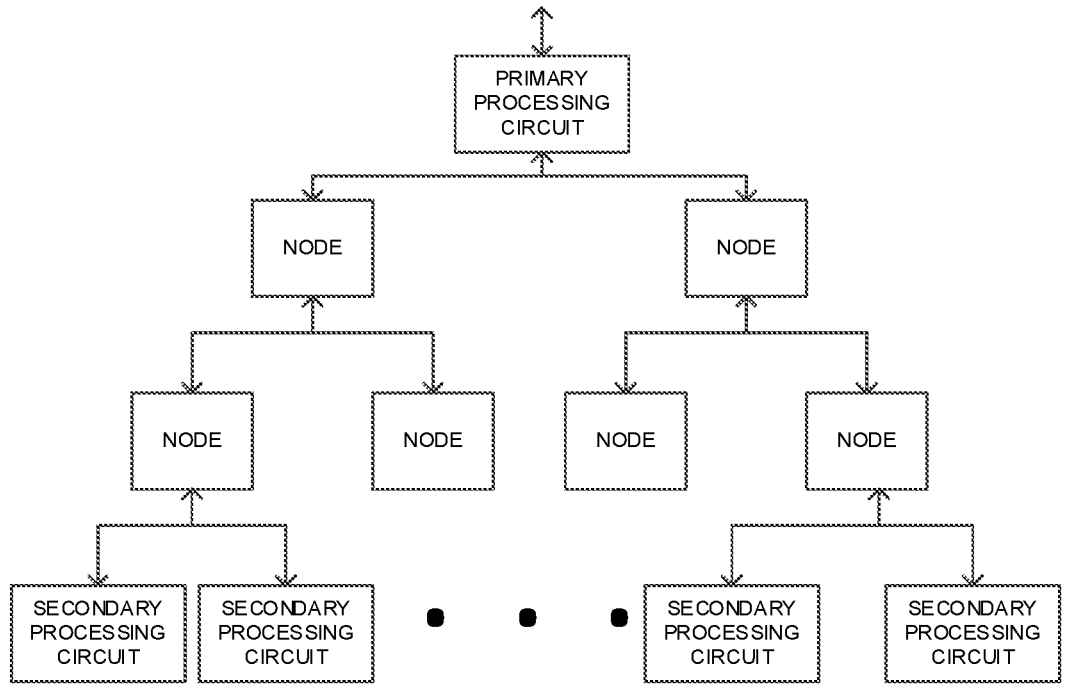
FIG. 11 is a structure diagram of a neural network operation unit according to an example of the disclosure.

In some examples, the neural network operation unit, as illustrated in FIG. 11, may include a primary processing circuit and multiple secondary processing circuits. The operation unit may include a tree module. The tree module may include a root port and multiple branch ports. The root port of the tree module is connected with the primary processing circuit, and each of the multiple branch ports of the tree module is connected with a secondary processing circuit of the multiple secondary processing circuits respectively. The tree module is configured to forward a data block, a weight, and an operation instruction between the primary processing circuit and the multiple secondary processing circuits.

The tree module may be configured as an n-ary tree structure, the structure illustrated in FIG. 11 is a binary tree structure and may also be a ternary tree structure, and n may be an integer greater than or equal to two. A specific value of n is not limited in a specific implementation mode of the application. The layer number may also be two. The secondary processing circuits may be connected to nodes of another layer, except nodes of the last second layer, and, for example, may be connected to nodes of the last layer illustrated in FIG. 11.

Figure 12:
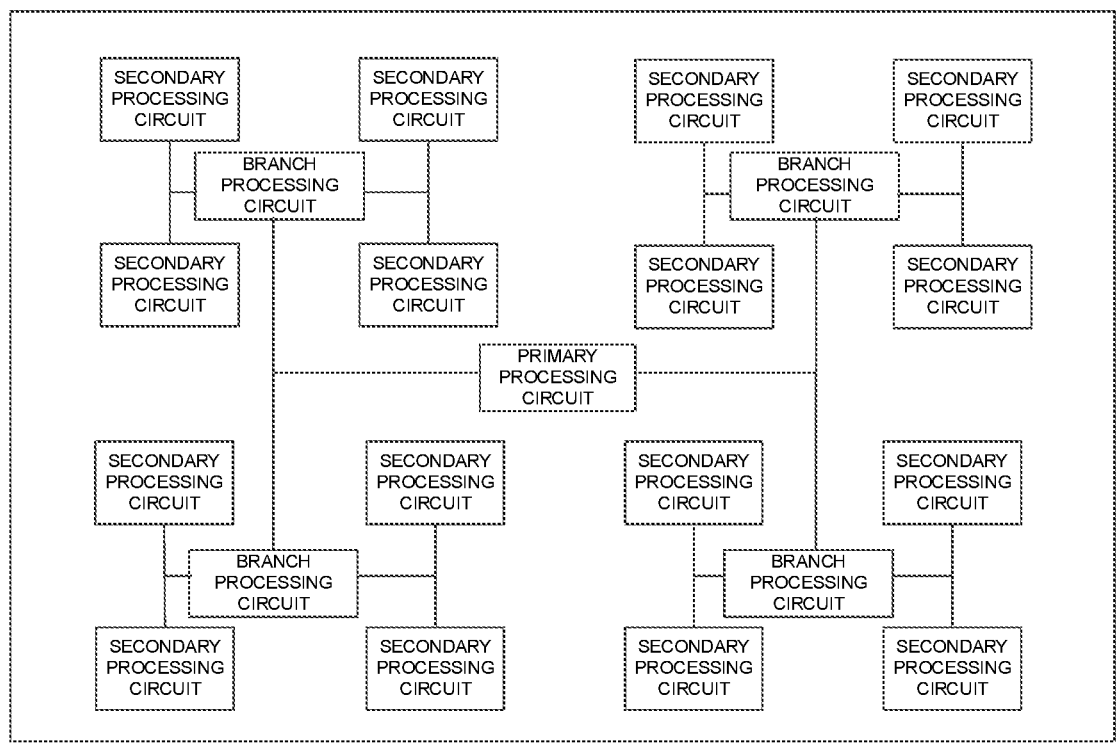
FIG. 12 is a structure diagram of a neural network operation unit according to another example of the disclosure.

In some examples, the neural network operation unit, as illustrated in FIG. 12, may include a primary processing circuit, multiple secondary processing circuits, and a branch processing circuit. The primary processing circuit is specifically configured to allocate a task in the task queue into multiple data blocks and send at least one data block of the multiple data blocks, the weight, and at least one operation instruction of multiple operation instructions to the branch processing circuit.

The branch processing circuit is configured to forward the data block, the weight, and the operation instructions between the primary processing circuit and the multiple secondary processing circuits.

The multiple secondary processing circuits are configured to execute computation on the received data block and the weight according to the operation instruction to obtain intermediate results and to transmit the intermediate results to the branch processing circuit.

The primary processing circuit is configured to perform subsequent processing on the intermediate results sent by the branch processing circuit to obtain a result of the operation instruction, and to send the result of the operation instruction to the control unit.

Figure 13:
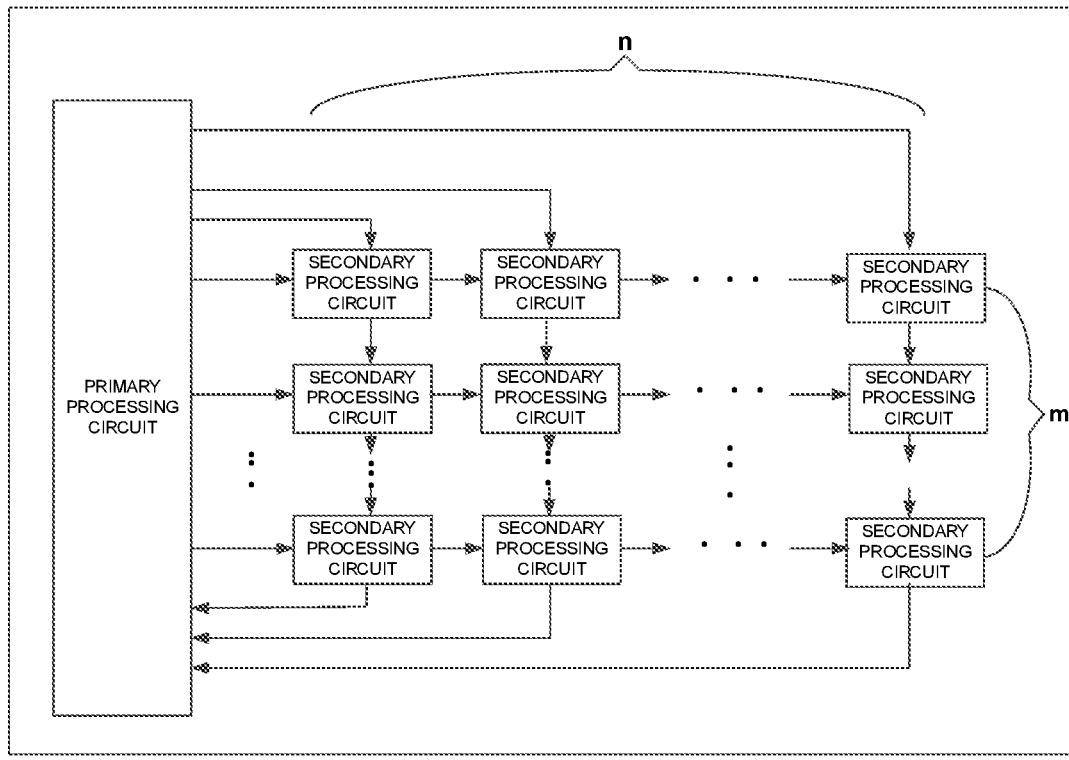
FIG. 13 is a structure diagram of a neural network operation unit according to another example of the disclosure.

In some examples, the neural network operation unit, as illustrated in FIG. 13, may include a primary processing circuit and multiple secondary processing circuits. The multiple secondary processing circuits are distributed in an array. Each secondary processing circuit is connected with the other adjacent secondary processing circuits. The primary processing circuit is connected with k secondary processing circuits in the multiple primary processing circuits, and the k secondary processing circuits include n secondary processing circuits in a first row, n secondary processing circuits in an $m^{th}$ row, and m secondary processing circuits in a first column.

The k secondary processing circuits are configured to forward data and instructions between the primary processing circuit and the multiple secondary processing circuits.

The primary processing circuit is configured to allocate a piece of input data into multiple data blocks and to send at least one data block of the multiple data blocks and at least one operation instruction of multiple operation instructions to the k secondary processing circuits.

The k secondary processing circuits are configured to convert the data between the primary processing circuit and the multiple secondary processing circuits.

The multiple secondary processing circuits are configured to execute computation on the received data block according to the operation instruction to obtain intermediate results and to transmit the intermediate results to the k secondary processing circuits.

The primary processing circuit is configured to perform subsequent processing on the intermediate results sent by the k secondary processing circuits to obtain a result of the operation instruction and send the result of the operation instruction to the control unit. The above is only exemplary description and not intended to limit the disclosure. The neural network operation unit may be replaced with a non-neural network operation unit. The non-neural network operation unit is, for example, a universal operation unit. Universal computation may include a corresponding universal operation instruction and data and its computation process is similar to the neural work computation. The universal computation may be, for example, scalar arithmetic computation and scalar logical computation. The universal operation unit may include, but is not limited to, for example, one or more multipliers and one or more adders, and executes basic computation, for example, addition and multiplication.

In some examples, the primary processing circuit is specifically configured to combine and sequence the intermediate results sent by the multiple secondary processing circuits to obtain the result of the operation instruction.

In some examples, the primary processing circuit is specifically configured to combine, sequence, and activate the intermediate results sent by the multiple processing circuits to obtain the result of the operation instruction.

In some examples, the primary processing circuit may include one or any combination of a conversion processing circuit, an activation processing circuit, and an addition processing circuit.

The conversion processing circuit is configured to execute preprocessing on the data, specifically to execute exchange between a first data structure and a second data structure on data or intermediate results received by the primary processing circuit, or to execute exchange between a first data type and a second data type on the data or the intermediate results received by the primary processing circuit.

The activation processing circuit is configured to execute subsequent processing, specifically to execute activation computation on data in the primary processing circuit.

The addition processing circuit is configured to execute subsequent processing, specifically to execute addition computation or accumulation computation.

In some examples, the secondary processing circuit may include a multiplication processing circuit.

The multiplication processing circuit is configured to execute product computation on the received data block to obtain a product result.

In some examples, the secondary processing circuit may further include an accumulation processing circuit. The accumulation processing circuit is configured to execute accumulation computation on the product result to obtain the intermediate result.

In some examples, the tree module is configured as an n-ary tree structure, n being an integer greater than or equal to two.

Another example of the disclosure provides a chip, which may include the data processing device of the abovementioned example.

Another example of the disclosure provides a chip package structure, which may include the chip of the abovementioned example.

Another example of the disclosure provides a board card, which may include the chip package structure of the abovementioned example.

Another example of the disclosure provides an electronic device, which may include the board card of the abovementioned example. The electronic device may include a robot, a computer, a printer, a smayner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic smayner, and/or an electrocardiograph.

All of the units and modules in the disclosure may be hardware structures, physical implementation of the hardware structures may include, but is not limited to, physical devices, and the physical devices include, but are not limited to, transistors, memristors, and deoxyribonucleic acid (DNA) computers.

The disclosure provides a data redundancy method. Data is divided into multiple importance ranks, and different data redundancy processing is performed for data of different importance ranks. Therefore, a storage capacity overhead and a memory access power consumption overhead are reduced on the basis of ensuring security and reliability of stored data.

Figure 14:
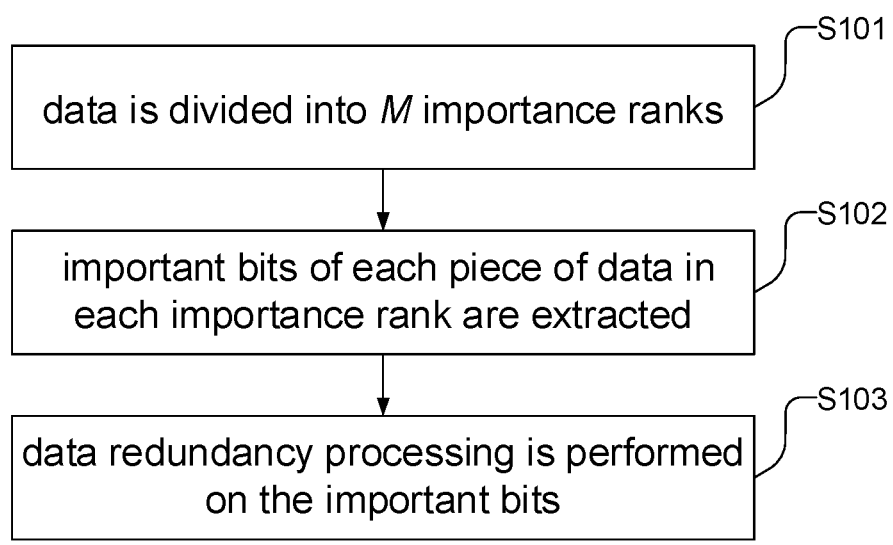
FIG. 14 is a flowchart of a data redundancy method according to an example of the disclosure.

Specifically, FIG. 14 is a flowchart of a data redundancy method. As illustrated in FIG. 14, the data redundancy method specifically may include the following steps.

In S101, data is divided into M importance ranks, M being a positive integer.

Specifically, the importance ranks of the data may be set by comprehensively considering factors such as a size of the data, a magnitude of an absolute value of the data, a type (floating point type and fixed point type) of the data, a read operation frequency of the data, and a write operation frequency of the data.

In S102, important bits of each piece of data in each importance rank are extracted.

Specifically, bits in the data are divided into important bits and unimportant bits. If the data has totally x bits in which y bits are important bits and (x-y) bits are unimportant bits, both of x and y being positive integers and $0 \geq y < x$, only the y important bits of the data are subsequently processed. Positions of the y important bits may be continuous and may also be discontinuous.

In S103, data redundancy processing is performed on the important bits.

Specifically, data redundancy processing may include replica redundancy processing and/or ECC processing. Different processing may be performed according to different importance. For example, when all bits in a piece of data are all important bits, ECC processing may be performed on all the bits of the data. When part of bits in a piece of data are important bits, replica redundancy processing is performed on the important bits of the data.

Replica redundancy may include implementing redundancy backup in the same storage medium and may also implement redundancy backup in different storage media. N data replicas may simultaneously be backed up, where N is a positive integer greater than zero. An ECC manner may include CRC and ECC.

The data redundancy method in the example will be specifically introduced below with some examples.

In some examples of the disclosure, redundancy storage is performed on a control unit, and redundancy storage is not performed on an operation unit. For example, redundancy storage is performed on the neural network instruction; redundancy storage is not performed on the parameter; the neural network instruction is configured as the first importance rank; and the neural network parameter is configured as a second importance rank. The neural network parameter may include topological structure information, neuron data and weight data. Redundancy storage is performed on data of the first importance rank and redundancy storage is not performed on data of the second importance rank. When a read operation is executed on the data of the first importance rank, raw data and two backed-up data replicas are read, in case of corresponding data inconsistency, two replicas of data which are the same are determined as finally read data, and the third replica of data which is inconsistent is simultaneously modified. When a write operation is executed on the data of the first importance rank, the data is simultaneously written back to two backup addresses, and the raw data and the two backed-up data replicas are ensured to be consistent.

Figure 16:
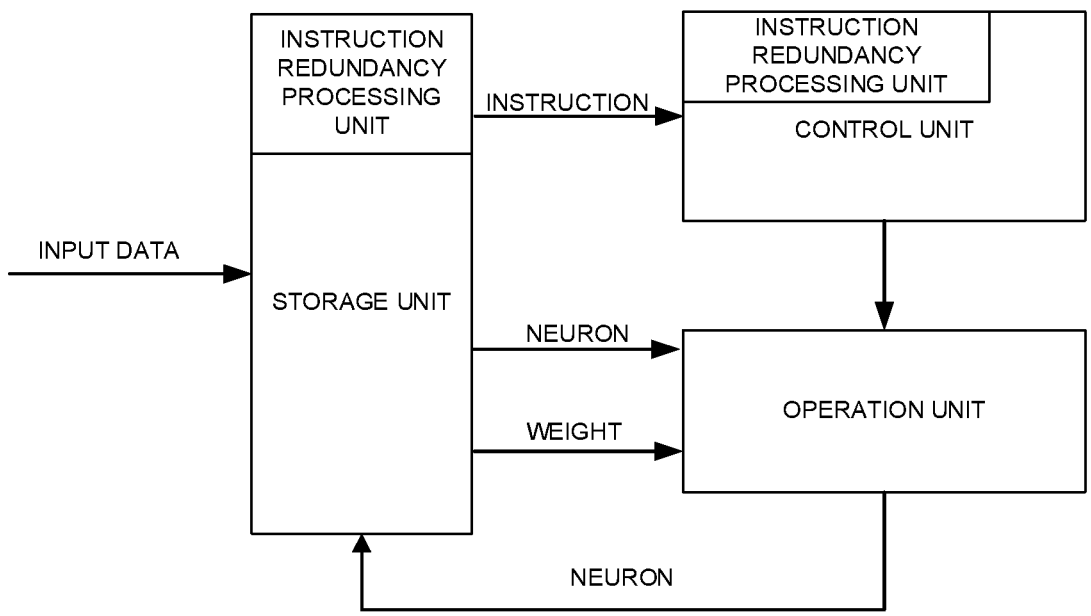
FIG. 16 is a neural network processor according to an example of the disclosure.

As illustrated in FIG. 16, a neural network processor may include a storage unit, a control unit, and an operation unit.

The storage unit is configured to receive external input data, to store a neuron, weight, and an instruction of a neural network, to send the instruction to the control unit, and to send the neuron and the weight to the operation unit.

The control unit is configured to receive the instruction sent by the storage unit and decode the instruction to generate control information to control the operation unit.

The operation unit is configured to receive the weight and the neuron sent by the storage unit, to complete neural network training computation, and to retransmit an output neuron to the storage unit for storage.

The neural network processor may further include an instruction redundancy processing unit. The instruction redundancy processing unit is embedded in the storage unit and the instruction control unit respectively to perform data redundancy processing on the instruction.

In some examples of the disclosure, a topological structure of the operation unit is illustrated in FIG. 11. The operation unit may include a primary processing circuit and multiple secondary processing circuits. The topological structure illustrated in FIG. 11 is a tree module. The tree module may include a root port and multiple branch ports. The root port of the tree module is connected with the primary processing circuit, and each of the multiple branch ports of the tree module is connected with a secondary processing circuit of the multiple secondary processing circuits respectively. The tree module is configured to forward a data block, a weight, and an operation instruction between the primary processing circuit and the multiple secondary processing circuits. As illustrated in FIG. 11, the tree module may include a multilayer node structure, a node is a structure with a forwarding function, and the node may have no computation function.

In some examples of the disclosure, the topological structure of the operation unit is illustrated in FIG. 12. The operation unit may include a primary processing circuit, multiple secondary processing circuits and a branch processing circuit. The primary processing circuit is specifically configured to allocate an input neuron into multiple data blocks and send at least one data block of the multiple data blocks, the weight and at least one operation instruction of multiple operation instructions to the branch processing circuit.

The branch processing circuit is configured to forward the data block, the weight, and the operation instruction between the primary processing circuit and the multiple secondary processing circuits.

The multiple secondary processing circuits are configured to execute computation on the received data block and the weight according to the operation instruction to obtain intermediate results and to transmit the intermediate results to the branch processing circuit.

The primary processing circuit is configured to perform subsequent processing on the intermediate results sent by the branch processing circuit to obtain a result of the operation instruction and to send the result of the operation instruction to the control unit.

In some examples of the disclosure, the topological structure of the operation unit is illustrated in FIG. 13. The operation unit may include a primary processing circuit and multiple secondary processing circuits. The multiple secondary processing circuits are distributed in an array. Each secondary processing circuit is connected with the other adjacent secondary processing circuits. The primary processing circuit is connected with k secondary processing circuits in the multiple primary processing circuits, and the k secondary processing circuits include n secondary processing circuits in a first row, n secondary processing circuits in an $m^{th}$ row, and m secondary processing circuits in a first column.

The k secondary processing circuits are configured to forward data and instructions between the primary processing circuit and the multiple secondary processing circuits.

The primary processing circuit is configured to allocate a piece of input data into multiple data blocks and send at least one data block of the multiple data blocks and at least one operation instruction of multiple operation instructions to the k secondary processing circuits.

The k secondary processing circuits are configured to convert the data between the primary processing circuit and the multiple secondary processing circuits.

The multiple secondary processing circuits are configured to execute computation on the received data block according to the operation instruction to obtain intermediate results and to transmit the intermediate results to the k secondary processing circuits.

The primary processing circuit is configured to perform subsequent processing on the intermediate results sent by the k secondary processing circuits to obtain a result of the operation instruction and send the result of the operation instruction to the control unit. In some examples, the primary processing circuit is specifically configured to combine and sequence the intermediate results sent by the multiple secondary processing circuits to obtain the result of the operation instruction.

In some examples, the primary processing circuit is specifically configured to combine, sequence and activate the intermediate results sent by the multiple processing circuits to obtain the result of the operation instruction.

In some examples, the primary processing circuit may include one or any combination of a conversion processing circuit, an activation processing circuit and an addition processing circuit.

The conversion processing circuit is configured to execute preprocessing on the data, specifically to execute exchange between a first data structure and a second data structure on data or intermediate results received by the primary processing circuit, or to execute exchange between a first data type and a second data type on the data or the intermediate results received by the primary processing circuit.

The activation processing circuit is configured to execute subsequent processing, specifically to execute activation computation on data in the primary processing circuit.

The addition processing circuit is configured to execute subsequent processing, specifically to execute addition computation or accumulation computation.

In some examples, the secondary processing circuit may include a multiplication processing circuit.

The multiplication processing circuit is configured to execute product computation on the received data block to obtain a product result.

In some examples, the secondary processing circuit may further include an accumulation processing circuit. The accumulation processing circuit is configured to execute accumulation computation on the product result to obtain an intermediate result.

In some examples, the tree module is configured as an n-ary tree structure, n being an integer greater than or equal to two.

In some examples, data redundancy is performed on a neural network parameter.

At first, M importance ranks, first, second, . . . , $M^{th}$ importance ranks, are determined for the neural network parameter according to a magnitude of an absolute value of the parameter, and the parameter is correspondingly divided into a corresponding importance rank.

Specifically, M+1 threshold values are set and are recorded as $T_0, T_1, T_2, \ldots, T_M$ respectively after being sequenced from large to small. When the absolute value D of the neural network parameter meets $T_{i-1} > D > T_i$, the data is divided into the $i^{th}$ importance rank, where i=1, 2 . . . , M, $T_0, T_1, T_2, \ldots T_M$ are all real numbers and $T_0 > T_1 > T_2 > \ldots > T_M \geq 0$. That is, when the absolute value of the neural network parameter meets $T_0 > D > T_1$, the neural network parameter is divided into the first importance rank, when the absolute value of the neural network parameter meets $T_1 > D > T_2$, the neural network parameter is divided into the second importance rank, and so on.

A floating point type parameter in parameters of the $i^{th}$ importance rank has totally $x_i$ bits, and it is set that sign bits and first $y_i$ bits of an exponential part and a base part are specified as important bits, where both of $x_i$ and $y_i$ are positive integers, and $0 < y_i \geq x_i$.

A fixed point type parameter in parameters of the $i^{th}$ importance rank has totally $x_i$ bits, and it is set that sign bits and first $z_i$ bits of a numerical part are specified as important bits, where both of $x_i$ and $z_i$ are positive integers, and $0 < z_i \geq x_i$.

A data backup manner is adopted for data redundancy of important bits in a parameter of the $i^{th}$ importance rank, two replicas are backed up and redundancy storage is not performed on unimportant bits. When a read operation is executed on the parameter of the $i^{th}$ importance rank, raw data and two backed-up data replicas are simultaneously read for important bits, in case of corresponding data inconsistency, two replicas of data which are the same are determined as finally read data, and the third replica of data which is inconsistent is simultaneously modified. When a write operation is executed on the parameter of the $i^{th}$ importance rank, the important bits are simultaneously written back to two backup addresses, and the data in the raw data and the two backed-up data replicas are ensured to be consistent.

In some examples, data redundancy is performed on a sparse neural network parameter.

In the example, the sparse neural network parameter is divided into two parts, i.e., a nonzero parameter and a nonzero parameter position respectively.

The nonzero parameter position is configured as the first importance rank, all other bits are marked as important bits and a CRC code manner is adopted for redundancy storage. When a read operation is executed, a stored CRC code is read, a CRC code of raw data is calculated, and if the two CRC codes are inconsistent, the data is corrected according to the stored CRC code. When a write operation is executed, both of the raw data and the CRC code are stored.

An importance rank is set for the nonzero parameter of the neural network according to a magnitude of an absolute value of the parameter, and M−1 importance ranks are sequentially set from the second importance rank. M threshold values are set and are recorded as $T_1, T_2, \ldots T_M$ respectively after being sequenced from large to small. When the absolute value D of the nonzero parameter meets $T_{i-1} > D > T_i$, the data is divided into the $i^{th}$ importance rank, where $i = 2, 3 \ldots, M$, $T_1, T_2, \ldots T_M$ are all real numbers and $T_1 > T_2 > \ldots > T_M \leq 0$. That is, when the absolute value of the nonzero parameter meets $T_1 > D > T_2$, the nonzero parameter is divided into the second importance rank, when the absolute value of the nonzero parameter meets $T_2 > D > T_3$, the nonzero parameter is divided into the third importance rank, and so on.

A floating point type parameter in parameters of the $i^{th}$ importance rank has totally $x_i$ bits, and it is set that sign bits and first $y_i$ bits of an exponential part and a base part are specified as important bits, where both of $x_i$ and $y_i$ are positive integers, and $0 < y_i \geq x_i$.

A fixed point type parameter in parameters of the $i^{th}$ importance rank has totally $x_i$ bits, and it is set that sign bits and first $z_i$ bits of a numerical part are specified as important bits, where both of $x_i$ and $z_i$ are positive integers, and $0 < z_i \geq x_i$.

A data backup manner is adopted for data redundancy of important bits in a parameter of the $i^{th}$ importance rank. Two replicas are backed up and redundancy storage is not performed on unimportant bits. When a read operation is executed on the parameter of the $i^{th}$ importance rank, raw data and two backed-up data replicas are simultaneously read for important bits, in case of corresponding data inconsistency, two replicas of data which are the same are determined as finally read data, and the third replica of data which is inconsistent is simultaneously modified. When a write operation is executed on the parameter of the ith importance rank, the important bits are simultaneously written back to two backup addresses, and meanwhile, the data in the raw data and the two backed-up data replicas are ensured to be consistent.

In some examples, redundancy is performed on data in a diagram computation application.

In the example, the data in the diagram computation application is divided into two parts, including vertex data and side data.

The vertex data in the diagram computation application is configured as the first importance rank. All data bits are marked as important bits and a CRC code manner is adopted for redundancy storage. When a read operation is executed, a stored CRC code is read, and a CRC code of raw data is calculated, and if the two CRC codes are inconsistent, the data is corrected according to the stored CRC code. When a write operation is executed, both of the raw data and the CRC code are stored.

An importance rank is set for the side data in the diagram computation application according to an access frequency of the side data, and M−1 importance ranks are sequentially set from the second importance rank, and are recorded as $T_1, T_2, \ldots T_M$ respectively after being sequenced from large to small. When the access frequency F of the side data meets $T_{i-1} > F > T_i$, the data is divided into the $i^{th}$ importance rank, where $i=2, 3, \ldots M$, $T_1, T_2, \ldots, T_M$ are all real numbers and $T_1 > T_2 > \ldots > T_M \leq 0$. That is, when the access frequency of the side data meets $T_1 > F > T_2$, the side data is divided into the second importance rank, when the access frequency of the side data meets $T_2 > F > T_3$, the side data is divided into the third importance rank, and so on.

Floating point type side data in the $i^{th}$ importance rank has totally $x_i$ bits, and it is set that sign bits and first $y_i$ bits of an exponential part and a base part are specified as important bits, where both of $x_i$ and $y_i$ are positive integers, and $0 < y_i \geq x_i$.

Fixed point type side data in parameters of the $i^{th}$ importance rank has totally $x_i$ bits, and it is set that sign bits and first $z_i$ bits of a numerical part are specified as important bits, wherein both of $x_i$ and $z_i$ are positive integers, and $0 < z_i \geq x_i$.

A data backup manner is adopted for data redundancy of important bits in the side data of the $i^{th}$ importance rank. Two replicas are backed up and redundancy storage is not performed on unimportant bits. When a read operation is executed on the side data of the $i^{th}$ importance rank, raw data and two backed-up data replicas are simultaneously read for important bits, in case of data inconsistency, two replicas of data which are the same are determined as finally read data, and the third replica of data which is inconsistent is simultaneously modified. When a write operation is executed on the side data of the $i^{th}$ importance rank, the important bits are simultaneously written back to two backup addresses, and the data in the raw data and the two backed-up data replicas are ensured to be consistent.

Figure 15:
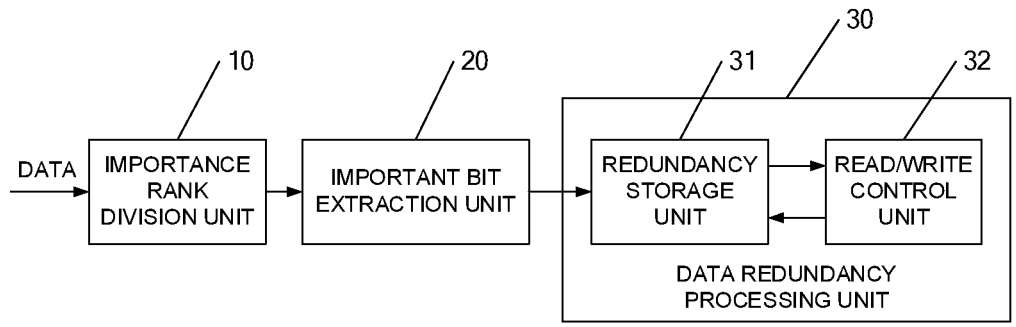
FIG. 15 is a structure block diagram of a data redundancy device according to another example of the disclosure.

In some examples, a data redundancy device 100 is provided. FIG. 15 is a structure block diagram of a data redundancy device. As illustrated in FIG. 15, the data redundancy device 100 may include an importance rank dividing unit 10, an important bit extraction unit 20, and a data redundancy processing unit 30.

The importance rank dividing unit 10 is configured to divide data into M importance ranks according to importance, M being a positive integer. Specifically, the importance ranks of the data may be set by comprehensively considering factors such as a size of the data, a magnitude of an absolute value of the data, a type (floating point type and fixed point type) of the data, a read operation frequency of the data, and a write operation frequency of the data.

The important bit extraction unit 20 is configured to extract important bits of each piece of data in each importance rank. The important bit extraction unit 20 may recognize data of different importance ranks, divide data bits into important data bits and unimportant data bits and extract important bits of each piece of data of each importance rank.

The data redundancy processing unit 30 is configured to perform data redundancy processing on the important bits.

As illustrated in FIG. 2, the data redundancy processing unit 30 may include a redundancy storage unit 31 and a read/write control unit 32.

The redundancy storage unit 31 may store raw data and perform data redundancy storage on the important bits in the data. Data redundancy may be replica backup or ECC. N replicas may simultaneously be backed up, where N is a positive integer greater than zero. An ECC manner may include, but is not limited to, CRC and ECC. The redundancy storage unit 31 may be a hard disk, a dynamic random access memory (DRAM), a static random access memory (SRAM), an ECC-DRAM, an ECC-SRAM, and a nonvolatile memory.

The read/write control unit 32 may execute a read/write operation on redundant data to ensure data read/write consistency.

The disclosure further provides a DVFS method for a neural network, which may include that: a real-time load and power consumption of a processor are acquired, and a topological structure of the neural network, a scale of the neural network, and an accuracy requirement of the neural network are acquired; and then, a voltage prediction and frequency prediction method is adopted to scale a working voltage and frequency of the processor. Therefore, performance of the processor is reasonably utilized, and power consumption of the processor is reduced.

Figure 17:
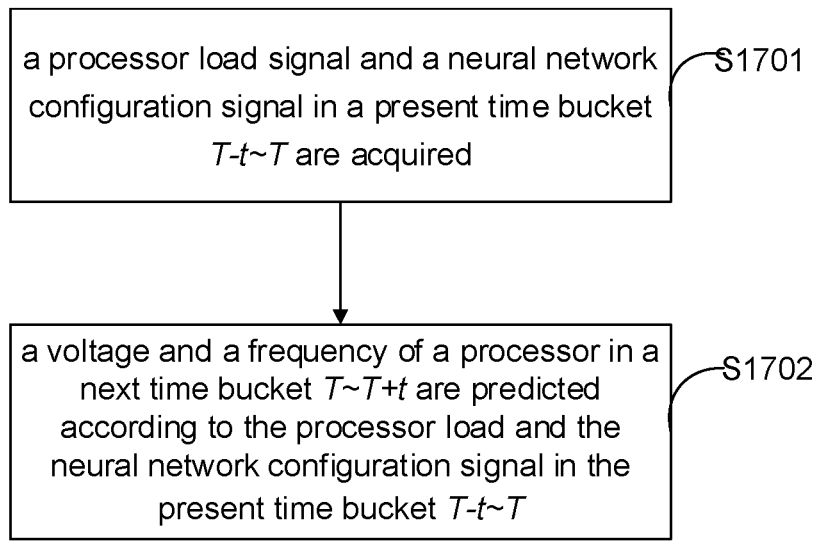
FIG. 17 is a flowchart of a DVFS method according to an example of the disclosure.
Figure 19:
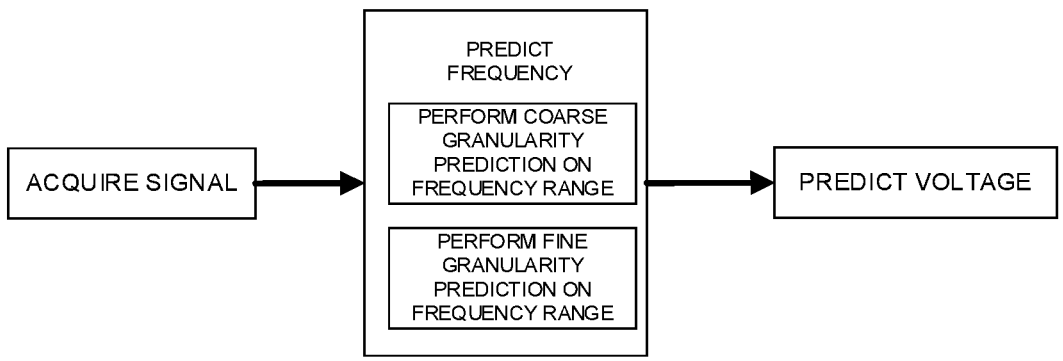
FIG. 19 is a schematic block diagram of a DVFS method according to an example of the disclosure.

FIG. 17 is a flowchart of a DVFS method according to an example of the disclosure. FIG. 19 is a schematic block diagram of a DVFS method according to an example of the disclosure.

Referring to FIG. 17 and FIG. 19, the DVFS method provided by the example of the disclosure may include the following steps.

In S1701, a processor load signal and a neural network configuration signal in a present time period T−t~T are acquired.

In S1702, a voltage and frequency of a processor in a next time period T~T+t are predicted according to the processor load and the neural network configuration signal in the present time period T−t~T, where T and t are real numbers greater than zero.

In S1701, the operation that the processor load signal in the present time period T−t~T is acquired refers to acquiring a workload of the processor in real time. The processor may be a dedicated processor for neural network operation.

In some examples, the processor may include a storage unit and a computation unit and may also include other functional units. The disclosure is not limited thereto. The workload of the processor may include a memory access load of the storage unit and a computation load of the computation unit. Power consumption of the processor may include memory access power consumption of the storage unit and computation power consumption of the computation unit.

In some examples of the disclosure, a topological structure of the computation unit is illustrated in FIG. 11. The computation unit may include a primary processing circuit and multiple secondary processing circuits. The topological structure illustrated in FIG. 11 is a tree module. The tree module may include a root port and multiple branch ports. The root port of the tree module is connected with the primary processing circuit, and each of the multiple branch ports of the tree module is connected with a secondary processing circuit of the multiple secondary processing circuits respectively. The tree module is configured to forward a data block, a weight, and an operation instruction between the primary processing circuit and the multiple secondary processing circuits. As illustrated in FIG. 11, the tree module may include a multilayer node structure, a node is a structure with a forwarding function, and the node may have no computation function.

In some examples of the disclosure, the topological structure of the computation unit is illustrated in FIG. 12. The computation unit may include a primary processing circuit, multiple secondary processing circuits, and a branch processing circuit. The primary processing circuit is specifically configured to allocate an input neuron into multiple data blocks and send at least one data block of the multiple data blocks, the weight and at least one operation instruction of multiple operation instructions to the branch processing circuit.

The branch processing circuit is configured to forward the data block, the weight, and the operation instruction between the primary processing circuit and the multiple secondary processing circuits.

The multiple secondary processing circuits are configured to execute computation on a received data block and the weight according to the operation instruction to obtain intermediate results and to transmit the intermediate results to the branch processing circuit.

The primary processing circuit is configured to perform subsequent processing on the intermediate results sent by the branch processing circuit to obtain a result of the operation instruction and to send the result of the operation instruction to the control unit.

In some examples of the disclosure, the topological structure of the computation unit is illustrated in FIG. 13. The computation unit may include a primary processing circuit and multiple secondary processing circuits. The multiple secondary processing circuits are distributed in an array. Each secondary processing circuit is connected with the other adjacent secondary processing circuits. The primary processing circuit is connected with k secondary processing circuits of the multiple primary processing circuits, and the k secondary processing circuits include n secondary processing circuits in a first row, n secondary processing circuits in an $m^{th}$ row, and m secondary processing circuits in a first column.

The k secondary processing circuits are configured to forward data and instructions between the primary processing circuit and the multiple secondary processing circuits.

The primary processing circuit is configured to allocate a piece of input data into multiple data blocks and to send at least one data block of the multiple data blocks and at least one operation instruction of multiple operation instructions to the k secondary processing circuits.

The k secondary processing circuits are configured to convert the data between the primary processing circuit and the multiple secondary processing circuits.

The multiple secondary processing circuits are configured to execute computation on the received data block according to the operation instruction to obtain intermediate results and to transmit the intermediate results to the k secondary processing circuits.

The primary processing circuit is configured to perform subsequent processing on the intermediate results sent by the k secondary processing circuits to obtain a result of the operation instruction and send the result of the operation instruction to the control unit.

In some examples, the primary processing circuit is specifically configured to combine and sequence the intermediate results sent by the multiple secondary processing circuits to obtain the result of the operation instruction.

In some examples, the primary processing circuit is specifically configured to combine, sequence, and activate the intermediate results sent by the multiple processing circuits to obtain the result of the operation instruction.

In some examples, the primary processing circuit may include one or any combination of a conversion processing circuit, an activation processing circuit, and an addition processing circuit.

The conversion processing circuit is configured to execute preprocessing on the data, specifically to execute exchange between a first data structure and a second data structure on data or intermediate results received by the primary processing circuit, or to execute exchange between a first data type and a second data type on the data or the intermediate results received by the primary processing circuit.

The activation processing circuit is configured to execute subsequent processing, specifically to execute activation computation on data in the primary processing circuit.

The addition processing circuit is configured to execute subsequent processing, specifically to execute addition computation or accumulation computation.

In some examples, the secondary processing circuit may include a multiplication processing circuit.

The multiplication processing circuit is configured to execute product computation on the received data block to obtain a product result.

In some examples, the secondary processing circuit may further include an accumulation processing circuit. The accumulation processing circuit is configured to execute accumulation computation on the product result to obtain the intermediate result.

In some examples, the tree module is configured as an n-ary tree structure, n being an integer greater than or equal to two. In some examples, the neural network configuration signal may include the type of a neural network layer presently processed by the processor, a scale of a parameter of the present layer, and real-time accuracy of the neural network.

In some examples, the frequency in the operation in S1702 that the voltage and the frequency of the processor in the next time period T~T+t are predicted may include: a frequency of the storage unit and/or the computation unit. Here, a manner of estimation, computation, prediction, induction, and the like may be adopted for prediction, and the prediction manner may be adopted.

In some examples, the operation that the frequency of the computation unit is predicted may include that: m segments of frequency scaling ranges are preset for the computation unit, generating m+1 frequency division points $f_0, f_1, \ldots, f_m$ in total, where $f_0 < f_1 < \ldots < f_m$, $f_0, f_1, \ldots, f_m$ are real numbers greater than zero and m is a positive integer greater than zero.

In some examples, the operation that the frequency of the storage unit is predicted may include that: m segments of neural network scales, totally m+1 scale division points $n_0, n_1, \ldots, n_m$, are preset, where $n_0 < n_1 < \ldots < n_m$, $n_0, n_1, \ldots, n_m$ are positive integers greater than zero and m is a positive integer greater than zero.

In some examples, the operation that the frequency of the storage unit is predicted may include that: a frequency scaling range of the computation unit is determined according to a range of a scale n of a present processing layer, and if $n_{i-1} < n < n_i$, the frequency scaling range of the computation unit is $f_{i-1} < f < f_i$.

In some examples, the operation that the frequency of the storage unit is predicted may include the following steps. The frequency scaling range of the computation unit is further narrowed according to the type of the present processing layer, where layers are divided into two types, that is, a compute-intensive layer and a memory access-intensive layer.

The compute-intensive layer may include a convolutional layer, and the memory access-intensive layer may include a fully connected layer, a pooling layer, and an active layer.

If the layer is a compute-intensive layer, the frequency scaling range of the computation unit is $(f_{i-1}+f_i)/2 < f < f_i$.

If the layer is a memory access-intensive layer, the frequency scaling range of the computation unit is $$f_{i-1}/2 < f < (f_{i-1}+f_i)/2.$$

In some examples, the operation that the frequency of the storage unit is predicted may include that: fine granularity regulation is performed on the frequency f of the computation unit according to the present accuracy of the neural network.

In some examples, the operation that the frequency of the storage unit is determined may include that: when the present accuracy of the neural network is higher than expected accuracy, the frequency of the computation unit is decreased, and when the present accuracy of the neural network is lower than the expected accuracy, the frequency of the computation unit is increased.

In some examples, the operation that the frequency of the storage unit is determined may include that: k segments of frequency scaling ranges, totally k+1 frequency division points $F_0, F_1, \ldots, F_k$, are preset for the storage unit, where $F_0 < F_1 < \ldots < F_k$, $F_0, F_1, \ldots, F_k$ are positive integers greater than zero and k is a positive integer greater than zero; and k segments of neural network scales, totally k+1 scale division points $N_0, N_1, \ldots, N_k$, are preset, where $N_0 < N_1 < \ldots < N_k$, $N_0, N_1, \ldots, N_k$ are positive integers greater than zero and k is a positive integer greater than zero.

In some examples, the operation that the frequency of the storage unit is determined may include that: a frequency scaling range of the storage unit is determined according to a range of a scale N of a present processing layer, and if $N_{i-1} < N < N_i$, the frequency scaling range of the storage unit is $F_{i-1} < F < F_i$.

In some examples, the operation that the frequency of the storage unit is predicted may include that: the frequency scaling range of the storage unit is further narrowed according to the type of the present processing layer; if the layer is a compute-intensive layer, the frequency scaling range of the storage unit is $F_{i-1} < F < (F_{i-1}+F_i)/2$; and if the layer is a memory access-intensive layer, the frequency scaling range of the storage unit is $(F_{i-1}+F_i)/2 < F < F_i$.

In some examples, the operation that the frequency of the storage unit is predicted may include that: fine granularity regulation is performed on the frequency of the storage unit according to the present accuracy of the neural network, and the frequency of the storage unit in the next time period is predicted.

In some examples, the operation that the frequency of the storage unit is determined may include that: when the present accuracy of the neural network is higher than expected accuracy, the memory access frequency of the storage unit is decreased, and when the present accuracy of the neural network is lower than the expected accuracy, the memory access frequency of the storage unit is increased.

The operation in S1702 that the voltage and the frequency of the processor in the next time period T~T+t are predicted may further include that: a prediction method is adopted to predict the voltage and the frequency of the processor in the next time period. The prediction method may include a preceding value method, a moving average load method, an exponentially weighted average method, and/or a minimum average method.

Figure 18:
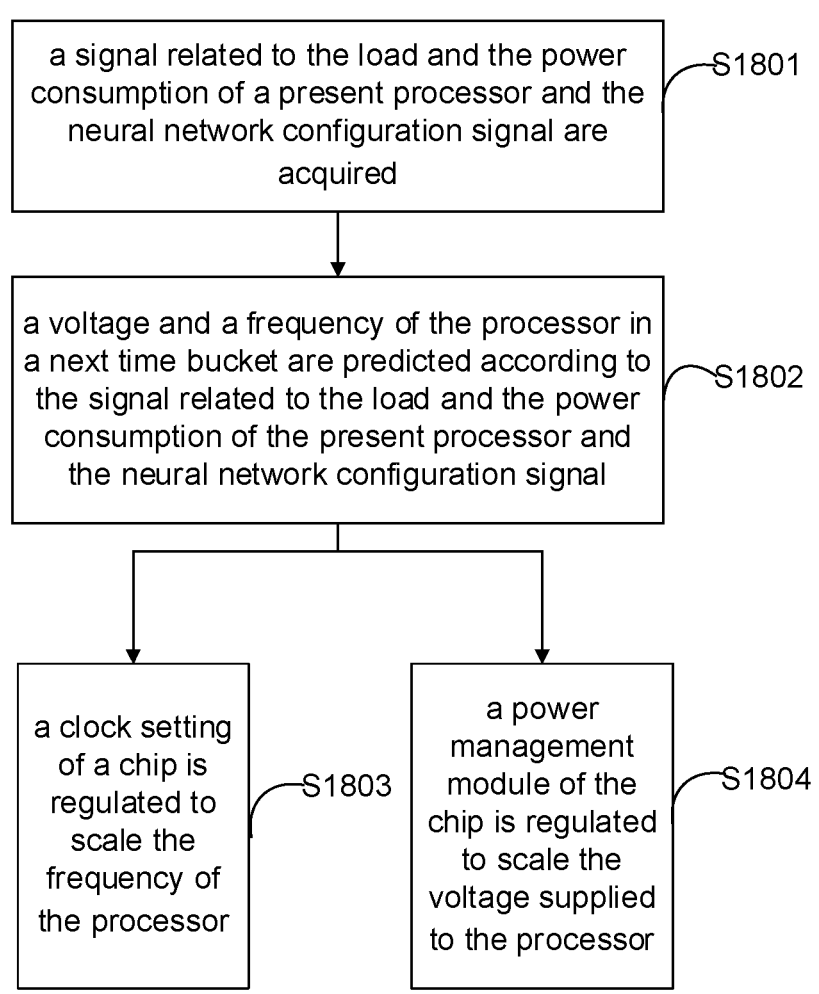
FIG. 18 is a flowchart of a DVFS method according to another example of the disclosure.

FIG. 18 is a flowchart of a DVFS method according to another example of the disclosure. In the scaling method of the example, S1801-S1802 are the same as S1701-S1702. The difference is that the method may further include S1803 and S1804.

After the operation that the voltage and the frequency of the processor in the next time period are predicted, the method may further include S1803: a clock setting of a chip is regulated according to the predicted frequency in the next time period to scale the frequency of the processor.

After the operation that the voltage and the frequency of the processor in the next time period are predicted, the method may further include S1804: a power management module of the chip is regulated according to the predicted frequency in the next time period, to scale the voltage supplied to the processor.

Figure 20:
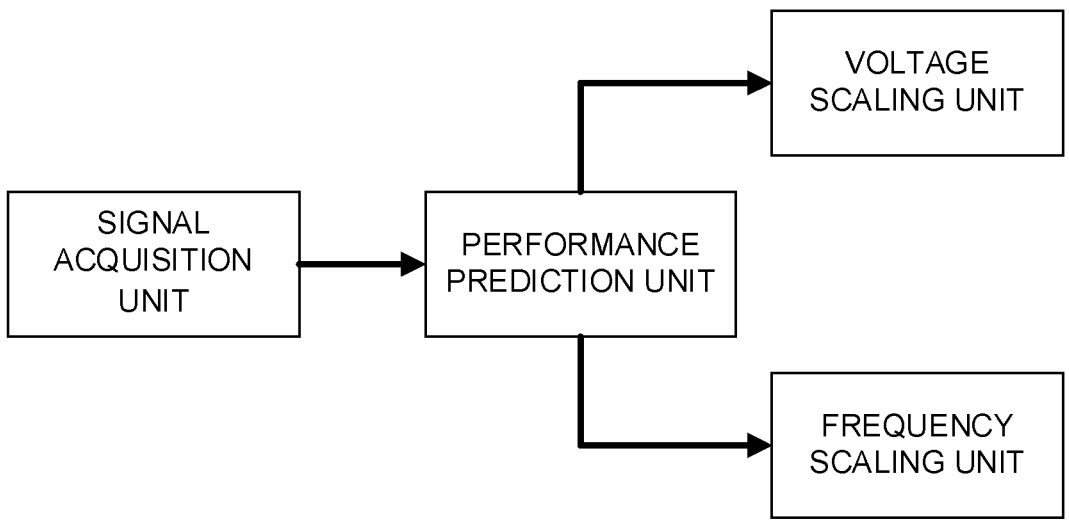
FIG. 20 is a schematic diagram of a DVFS co-processor according to an example of the disclosure.

FIG. 20 is a schematic diagram of a DVFS co-processor according to an example of the disclosure. According to another aspect of the disclosure, a DVFS co-processor is provided, which may include a signal acquisition unit and a performance prediction unit.

The signal acquisition unit is configured to acquire a workload of a processor, and is further configured to acquire a neural network configuration signal.

The performance prediction unit is configured to receive the neural network configuration signal and predict a frequency and voltage of the processor in a next time period according to a present load and power consumption of the processor.

The signal acquisition unit may acquire a signal related to the load and the power consumption of the processor and the neural network configuration signal, and transmit these signals to the performance prediction unit. The signal acquisition unit may acquire workloads of the computation unit and the storage unit in the neural network processor, and acquire a present layer type and a present layer scale for processing of a neural network and real-time accuracy of the neural network, and transmit these signals to the performance prediction unit.

The performance prediction unit may receive the signals acquired by the signal acquisition unit, predict performance required by the processor in the next time period according to a present system load condition and the neural network configuration signal and output a signal for scaling the frequency and the voltage.

In some examples, the frequency in the operation that the voltage and the frequency of the processor in the next time period are predicted in the performance prediction unit may include: a frequency of the storage unit and/or the computation unit.

As illustrated in FIG. 5, in some examples, the DVFS co-processor may further include a frequency scaling unit configured to receive a frequency scaling signal, determined by the performance prediction unit, of the processor in the next time period and scale the frequency of the storage unit and/or computation unit in the processor.

As illustrated in FIG. 5, in some examples, the DVFS co-processor may further include a voltage scaling unit configured to receive a voltage signal, predicted by the performance prediction unit, of the processor in the next time period and scale a voltage of the storage unit and/or computation unit in the processor.

As illustrated in FIG. 5, the performance prediction unit is connected with the signal acquisition unit, the voltage scaling unit, and the frequency scaling unit. The performance prediction unit receives the type of the layer presently processed by the processor and the scale of the present layer, performs coarse granularity prediction on a frequency range, then finely predicts the voltage and the frequency of the processor according to the present load and power consumption of the processor and the real-time accuracy of the neural network and finally outputs the signal for scaling the frequency and scaling the voltage.

In some examples, the operation that the frequency of the computation unit of the processor in the next time period is predicted in the performance prediction unit may include that: m segments of frequency scaling ranges are preset for the computation unit, generating m+1 frequency division points $f_0, f_1, \ldots, f_m$ in total, where $f_0 < f_1 < \ldots < f_m$, $f_0, f_1, \ldots, f_m$ are real numbers greater than zero and m is a positive integer greater than zero.

In some examples, the operation that the frequency of the computation unit of the processor in the next time period is predicted in the performance prediction unit may include that: m segments of neural network scales are preset, generating m+1 scale division points $n_0, n_1, \ldots, n_m$ in total, where $n_0 < n_1 < \ldots < n_m$, $n_0, n_1, \ldots, n_m$ are positive integers greater than zero and m is a positive integer greater than zero.

In some examples, the operation that the frequency of the computation unit of the processor in the next time period is predicted in the performance prediction unit may include that: a frequency scaling range of the computation unit is determined according to a range of a scale n of a present processing layer, and if $n_{i-1} < n < n_i$, the frequency scaling range of the computation unit is $f_{i-1} < f < f_i$.

In some examples, the operation that the frequency of the computation unit of the processor in the next time period is predicted in the performance prediction unit may include that: the frequency scaling range of the computation unit is further narrowed according to the type of the present processing layer, where layers are divided into two types, including a compute-intensive layer, i.e., a convolutional layer, and a memory access-intensive layer, i.e., a fully connected layer and/or a pooling layer; if the layer is a compute-intensive layer, the frequency scaling range of the computation unit is $(f_{i-1}+f_i)/2 < f < f_i$; and if the layer is a memory access-intensive layer, the frequency scaling range of the computation unit is $f_{i-1}/2 < f < (f_{i-1}+f_i)/2$.

In some examples, the operation that the frequency of the computation unit of the processor in the next time period is predicted in the performance prediction unit may include that: fine granularity regulation is performed on the frequency of the computation unit according to the present accuracy of the neural network.

In some examples, the operation that the frequency of the computation unit of the processor in the next time period is predicted in the performance prediction unit may include that:

when the present accuracy of the neural network is higher than expected accuracy, the frequency of the computation unit is decreased, and when the present accuracy of the neural network is lower than the expected accuracy, the frequency of the computation unit is increased.

In some examples, the operation that the frequency of the storage unit of the processor in the next time period is predicted in the performance prediction unit may include that: k segments of frequency scaling ranges are preset for the storage unit, generating k+1 frequency division points $F_0, F_1, \ldots, F_k$ in total, where $F_0 < F_1 < \ldots < F_k$, $F_0, F_1, \ldots, F_k$ are positive integers greater than zero and k is a positive integer greater than zero.

In some examples, the operation that the frequency of the storage unit of the processor in the next time period is predicted in the performance prediction unit may include that: k segments of neural network scales are preset, generating k+1 scale division points $N_0, N_1, \ldots, N_k$ in total, where $N_0 < N_1 < \ldots < N_k$, $N_0, N_1, \ldots, N_k$ are positive integers greater than zero and k is a positive integer greater than zero.

In some examples, the operation that the frequency of the storage unit of the processor in the next time period is predicted in the performance prediction unit may include that:

a frequency scaling range of the storage unit is determined according to a range of a scale N of the present processing layer, and if $N_{i-1} < N < N_i$, the frequency scaling range of the storage unit is $F_{i-1} < F < F_i$.

In some examples, the operation that the frequency of the storage unit of the processor in the next time period is predicted in the performance prediction unit may include that:

the frequency scaling range of the storage unit is further narrowed according to the type of the present processing layer; if the layer is a compute-intensive layer, the frequency scaling range of the storage unit is $F_{i-1} < F < (F_{i-1} + F_i)/2$; and if the layer is a memory access-intensive layer, the frequency scaling range of the storage unit is $(F_{i-1} + F_i)/2 < F < F_i$.

In some examples, the operation that the frequency of the storage unit of the processor in the next time period is predicted in the performance prediction unit may include that:

fine granularity regulation is performed on the frequency of the storage unit according to a present utilization rate and power consumption of the processor and the present accuracy of the neural network.

In some examples, the operation that the neural network configuration signal is acquired in the signal acquisition unit may include that: the present layer type and the present layer scale for processing of the neural network and the real-time accuracy of the neural network are acquired.

Figure 21:
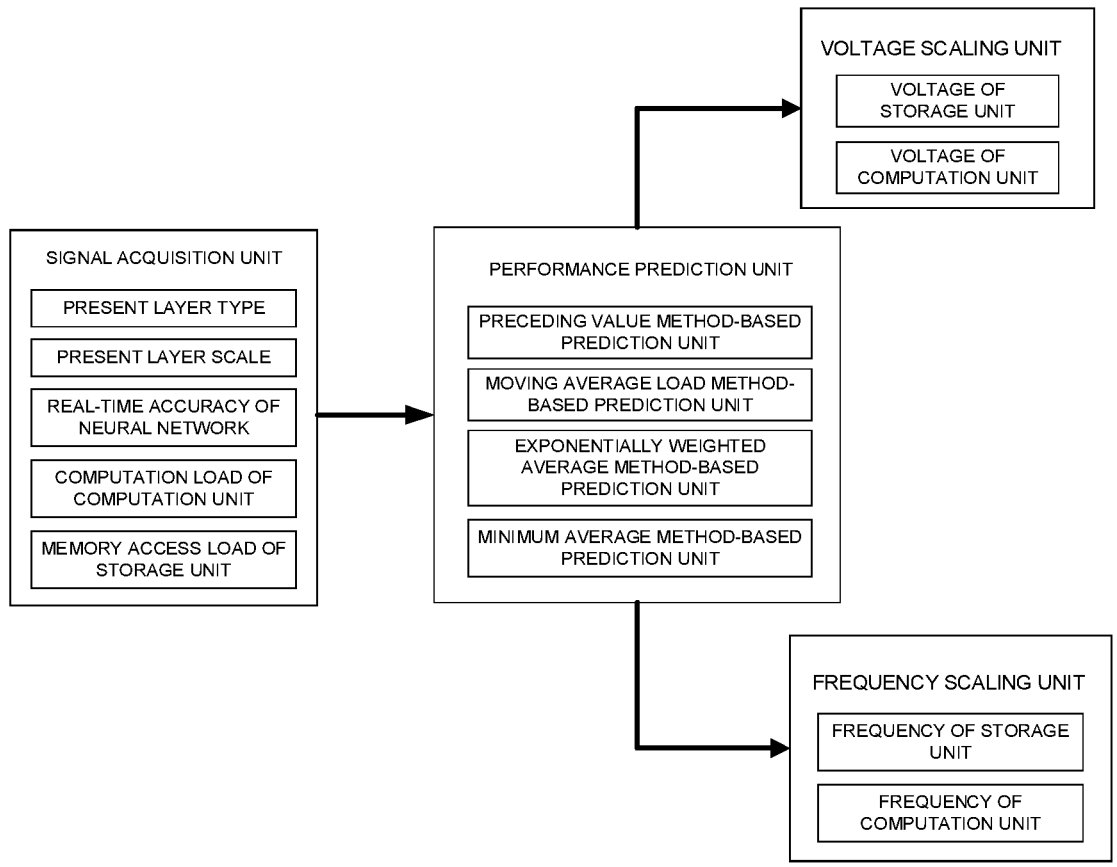
FIG. 21 is a schematic diagram of a DVFS co-processor according to another example of the disclosure.

As illustrated in FIG. 21, in some examples, the performance prediction unit may include at least one of: a preceding value method-based prediction unit, adopting a preceding value method to predict the voltage and the frequency of the processor in the next time period; a moving average load method-based prediction unit, adopting a moving average load method to predict the voltage and the frequency of the processor in the next time period; an exponentially weighted average method-based prediction unit, adopting an exponentially weighted average method to predict the voltage and the frequency of the processor in the next time period; and a minimum average method-based prediction unit, adopting a minimum average method to predict the voltage and the frequency of the processor in the next time period.

The disclosure provides the DVFS method and DVFS co-processor for the neural network. According to the DVFS method, the real-time load and power consumption of the processor are acquired, and the topological structure of the neural network, the scale of the neural network, and the accuracy requirement of the neural network are acquired; and then, a voltage prediction and frequency prediction method is adopted to scale the working voltage and frequency of the processor. Therefore, performance of the processor is reasonably utilized, and power consumption of the processor is reduced. A DVFS algorithm for the neural network is integrated in the DVFS co-processor, and thus the characteristics of topological structure, network scale, accuracy requirement, and the like of the neural network may be fully mined. The signal acquisition unit acquires a system load signal and a topological structure signal of the neural network, a neural network scale signal, and a neural network accuracy signal in real time; the performance prediction unit predicts the voltage and the frequency required by the system; the frequency scaling unit scales the working frequency of the neural network processor; and the voltage scaling unit scales the working voltage of the neural network processor. Therefore, the performance of the neural network processor is reasonably utilized, and the power consumption of the neural network processor is effectively reduced.

Figure 22:
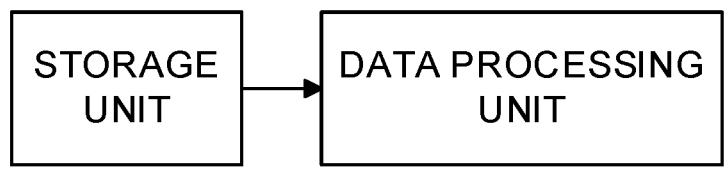
FIG. 22 is a functional module diagram of an information processing device according to an example of the disclosure.

The disclosure provides an information processing device. FIG. 22 is a functional module diagram of an information processing device according to an example of the disclosure. As illustrated in FIG. 22, the information processing device may include a storage unit and a data processing unit. The storage unit is configured to receive and store input data, an instruction, and output data. The input data may include one or more images. The data processing unit performs extraction and computational processing on a key feature included in the input data and generates a multidimensional vector for each image according to a computational processing result.

The key feature may include a facial action and expression, a key point position, and the like in the image. A specific form is a feature map (FM) in a neural network. The image may include a static picture, pictures forming a video, a video, or the like. The static picture, the pictures forming the video, or the video may include images of one or more parts of a face. The one or more parts of the face include facial muscles, lips, eyes, eyebrows, nose, forehead, ears, and combination thereof of the face.

Each element of the vector represents an emotion on the face, for example, anger, delight, pain, depression, sleepiness, and doubt. The storage unit is further configured to, after tagging an n-dimensional vector, output the n-dimensional vector, namely outputting the n-dimensional vector obtained by computation.

In some examples, the information processing device may further include a conversion module configured to convert the n-dimensional vector into a corresponding output. The output may be a control instruction, data (0, 1 output), a tag (happiness, depression, and the like), or picture output.

The control instruction may be single click, double click, and dragging of a mouse, single touch, multi-touch, and sliding of a touch screen, turning on and turning off of a switch, and a shortcut key.

In some examples, the information processing device is configured for adaptive training.

Correspondingly, the storage unit is configured to input n images, each image including a tag, each image corresponding to a vector (real emotion vector) and n being a positive integer greater than or equal to one.

The data processing unit takes calibrated data as an input, calculates an output emotion vector, i.e., a predicted emotion vector, in a format the same as the input, compares the output emotion vector with the real emotion vector and updates a parameter of the device according to a comparison result.

The emotion vector may include n elements. A value of each element of the emotion vector may include the following conditions.

(1) The value of each element of the emotion vector may be a number between zero and one (representing a probability of appearance of a certain emotion).

(2) The value of each element of the emotion vector may also be any number greater than or equal to zero (representing an intensity of a certain emotion).

(3) A value of only one element of the emotion vector is one and values of the other elements are zero. Under this condition, the emotion vector may only represent a strongest emotion.

Specifically, the predicted emotion vector may be compared with the real emotion vector in manners of calculating a Euclidean distance and calculating an absolute of dot product of the predicted emotion vector and the real emotion vector. For example, n is three; the predicted emotion vector is $[a_1,a_2,a_3]$; the real emotion vector is $[b_1,b_2,b_3]$; the Euclidean distance of the two is $[(a_1-b_1)^2+(a_2-b_2)^2+(a_3-b_3)^2]^{1/2}$; and the absolute value of the dot product of the two is $|a_1*b_1+a_2*b_2+a_3*b_3|$. Those skilled in the art may understand that the comparison manners are not limited to calculating the Euclidean distance and calculating the absolute value of the dot product, and other methods may also be adopted.

Figure 23:
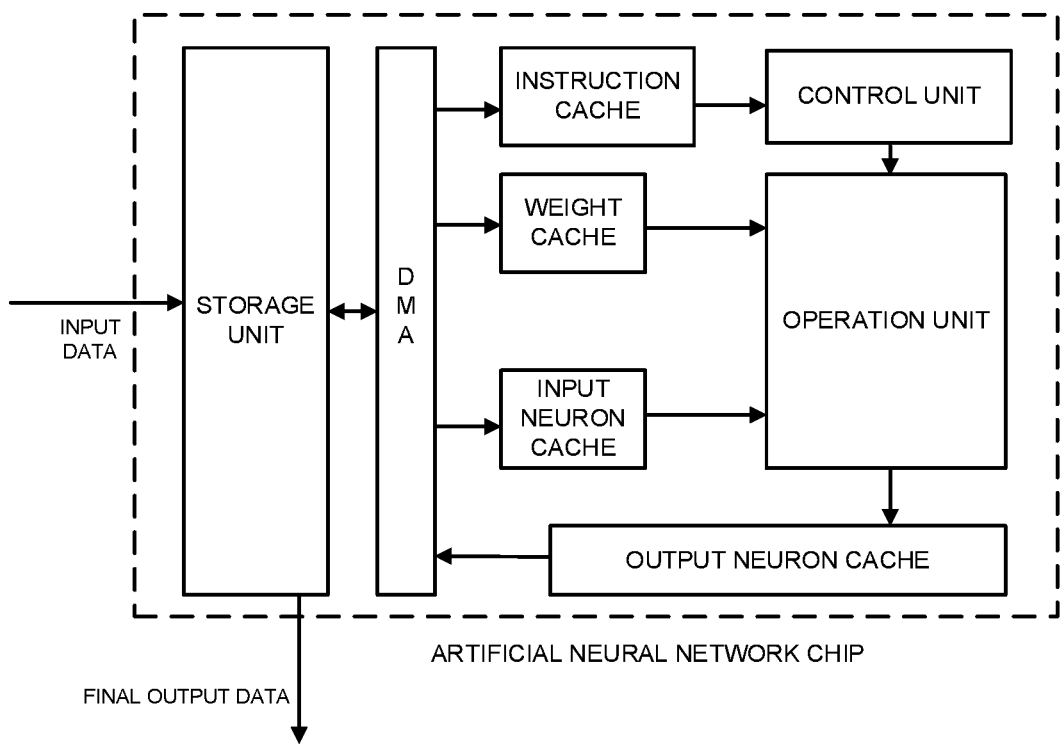
FIG. 23 is a schematic diagram of an artificial neural network chip configured as an information processing device according to an example of the disclosure.

In a specific example of the disclosure, as illustrated in FIG. 23, the information processing device is an artificial neural network chip. The operation that the parameter of the device is updated may include that: a parameter (weight, offset, and the like) of the neural network is adaptively updated.

The storage unit of the artificial neural network chip is configured to store the data and the instruction. The data may include an input neuron, an output neuron, a weight, the image, the vector, and the like. The data processing unit of the artificial neural network chip may include an operation unit configured to execute corresponding computation on the data according to an instruction stored in the storage unit. The operation unit may be a scalar computation unit configured to complete a scalar multiplication, a scalar addition, or a scalar multiplication and addition operation, or a vector computation unit configured to complete a vector multiplication, vector addition or vector dot product operation, or a hybrid computation unit configured to complete a matrix multiplication and addition operation, a vector dot product computation, and nonlinear computation, or convolutional computation. The computation executed by the operation unit may include neural network operation.

In some examples, a structure of the operation unit is illustrated in FIG. 11 to 13. A specific connecting relationship refers to the descriptions mentioned above and will not be elaborated herein.

In some examples, the operation unit may include, but is not limited to: a first part including a multiplier, a second part including one or more adders (more specifically, the adders of the second part form an adder tree), a third part including an activation function unit, and/or a fourth part including a vector processing unit. More specifically, the vector processing unit may process vector computation and/or pooling computation. The first part multiplies input data 1 ($in_1$) and input data 2 ($in_2$) to obtain a multiplied output (out), and a process is: $out=in_1 \times in_2$. The second part adds the input data $in_1$ through the adders to obtain output data (out). More specifically, when the second part is the adder tree, the input data $in_1$ is added step by step through the adder tree to obtain the output data (out), $in_1$ being a vector with a length N and N being greater than one, and a process is: $out=in_1[1]+in_1[2]+ \ldots +in_1[N]$; and/or the input data ($in_1$) is accumulated through the adder tree and then is added with the input data ($in_2$) to obtain the output data (out), and a process is: $out=in_1[1]+in_1[2]+ \ldots +in_1[N]+in_2$; or the input data ($in_1$) and the input data ($in_2$) are added to obtain the output data (out), and a process is: $out=in_1+in_2$. The third part executes computation on the input data (in) through an activation function (active) to obtain activation output data (out), and a process is: out=active(in). The activation function may be sigmoid, tanh, RELU, softmax, and the like. Besides an activation operation, the third part may implement another nonlinear function and may execute computation (f) on the input data (in) to obtain the output data (out), and a process is: out=f(in). The vector processing unit executes pooling computation on the input data (in) to obtain output data (out) after a pooling operation, and a process is out=pool(in). Pool is the pooling operation, the pooling operation may include, but is not limited to: average pooling, maximum pooling, and median pooling, and the input data in is data in a pooling core related to an output out.

The operation that the operation unit executes computation may include that: the first part multiplies the input data 1 and the input data 2 to obtain multiplied data; and/or the second part executes addition computation (more specifically, adder tree computation configured to add the input data 1 through the adder tree step by step) or adds the input data 1 and the input data 2 to obtain output data; and/or the third part executes the activation function computation, that is, executes computation on the input data through the activation function (active) to obtain the output data; and/or the fourth part executes the pooling computation, out=pool (in). Pool is the pooling operation, the pooling operation may include, but is not limited to: average pooling, maximum pooling, and median pooling, and the input data in is data in the pooling core related to the output out. The computation of one or more parts of the abovementioned parts may be freely selected for combination in different sequences, thereby implementing computation of various functions.

In a specific example of the disclosure, further referring to FIG. 23, the artificial neural network chip may further include a control unit, an instruction cache unit, a weight cache unit, an input neuron cache unit, an output neuron cache unit, and a DMA.

The control unit is configured to read an instruction from the instruction cache, decode the instruction into an operation unit instruction and input the operation unit instruction to the operation unit.

The instruction cache unit is configured to store the instruction.

The weight cache unit is configured to cache weight data.

The input neuron cache unit is configured to cache an input neuron input to the operation unit.

The output neuron cache unit is configured to cache an output neuron output by the operation unit.

The DMA is configured to read/write data or instructions in the storage unit, the instruction cache, the weight cache, the input neuron cache, and the output neuron cache.

Figure 24:
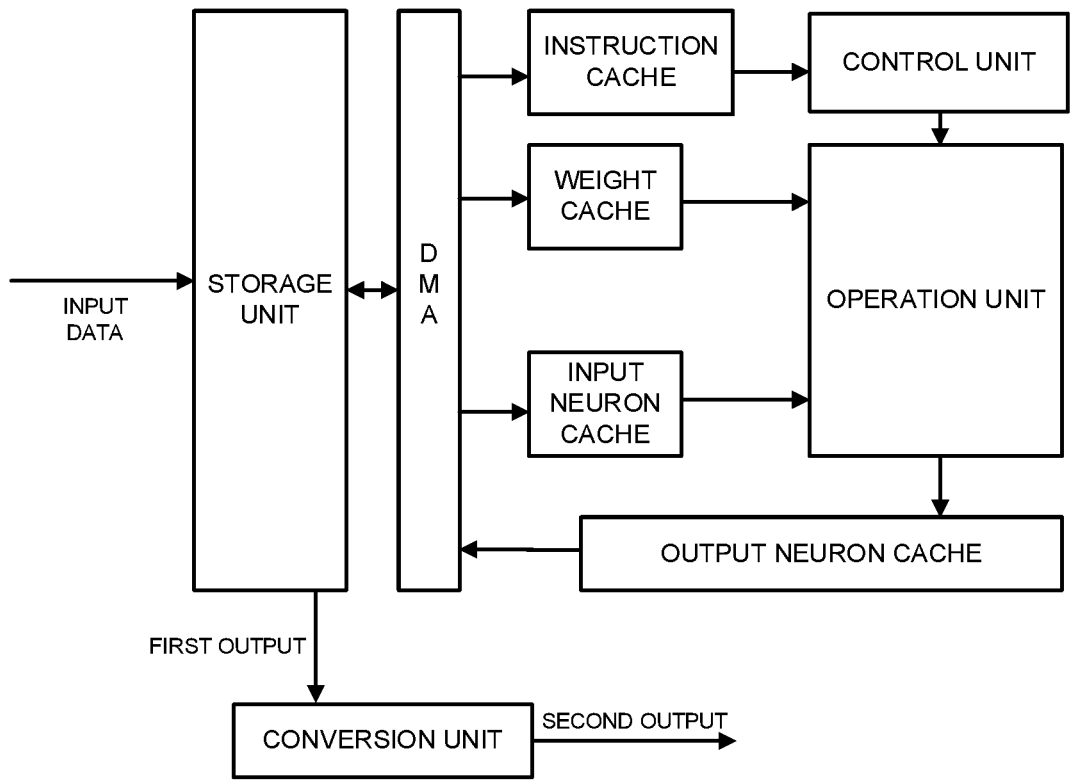
FIG. 24 is a schematic diagram of an artificial neural network chip configured as an information processing device according to an example of the disclosure.

In a specific example of the disclosure, as illustrated in FIG. 24, the artificial neural network chip may further include a conversion unit, connected with the storage unit and configured to receive first output data (data of a final output neuron) and convert the first output data into second output data.

Figure 25:
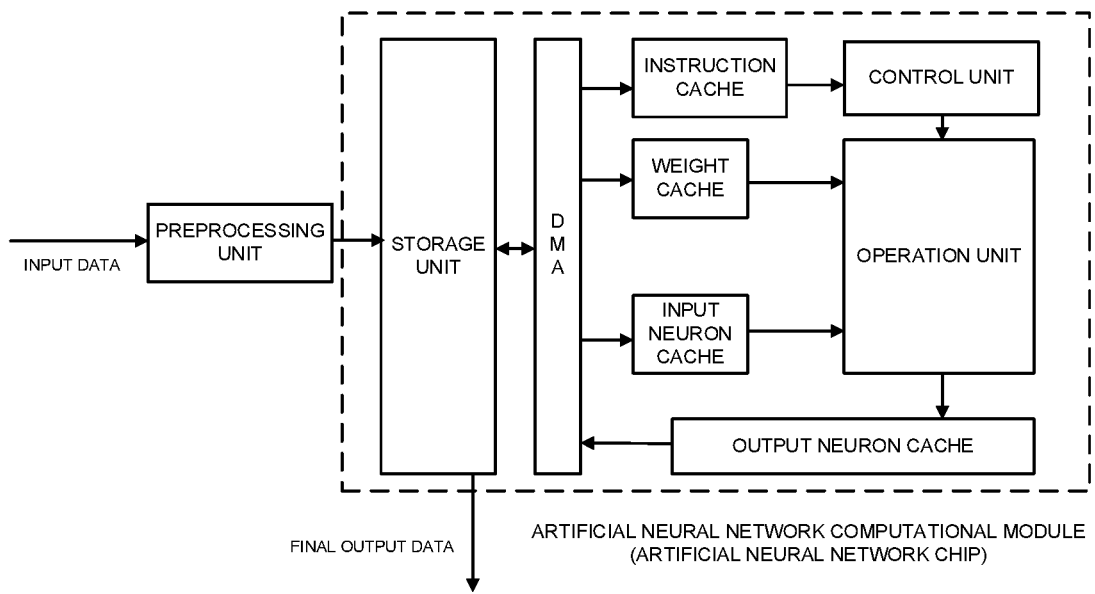
FIG. 25 is a schematic diagram of an artificial neural network chip configured as an information processing device according to an example of the disclosure.
Figure 26:
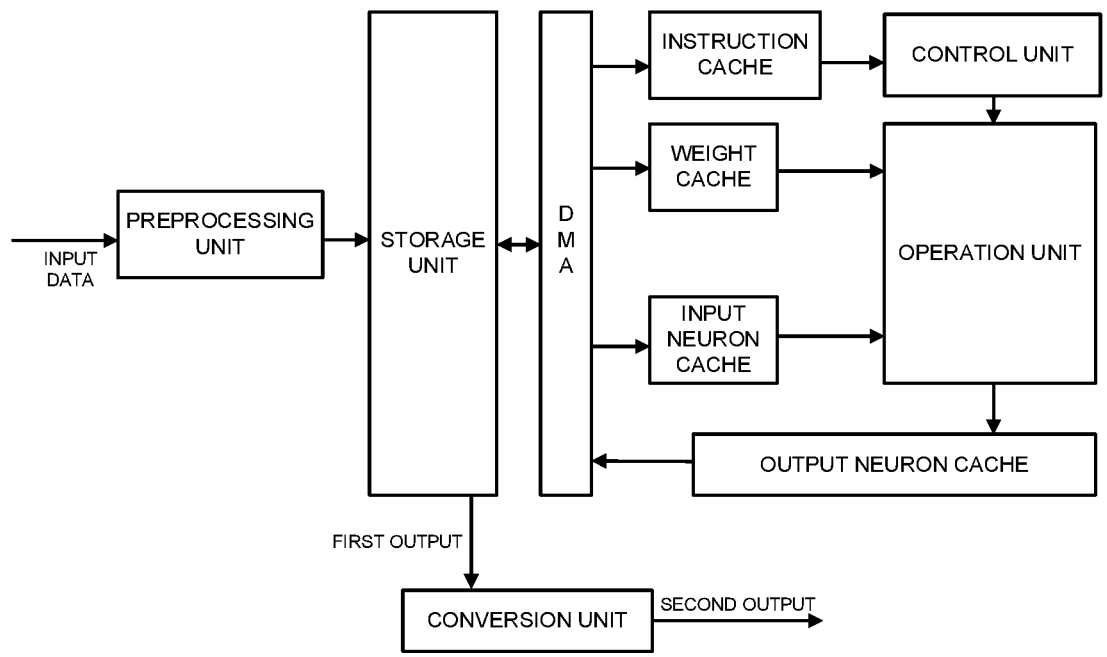
FIG. 26 is a schematic diagram of an artificial neural network chip configured as an information processing device according to an example of the disclosure.

The neural network has a requirement on a format of an input picture, for example, a length, a width, and a color channel. As one alternative implementation, in a specific example of the disclosure, as illustrated in FIG. 25 and FIG. 26, the artificial neural network chip may further include a preprocessing unit configured to preprocess original input data, i.e., one or more images, to obtain image data consistent with an input layer scale of a bottom layer of an artificial neural network adopted by the chip to meet the requirement of a preset parameter and data format of the neural network. Preprocessing may include segmentation, Gaussian filtering, binarization, regularization, normalization, and the like.

The preprocessing unit may exist independently of the chip. That is, the preprocessing unit may be configured as an information processing device including a preprocessing unit and a chip. The preprocessing unit and the chip are configured as described above.

Figure 27:
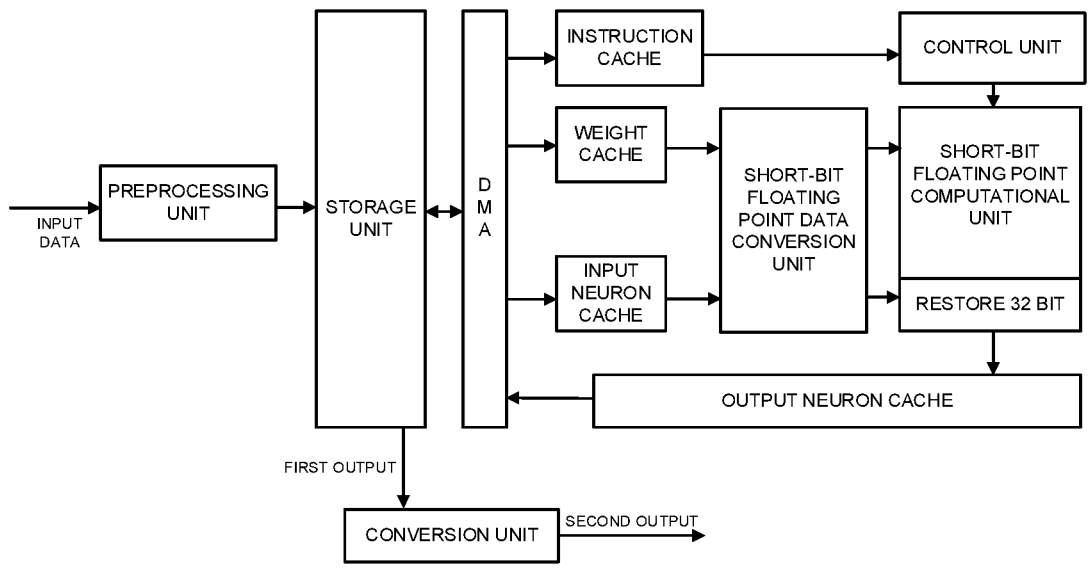
FIG. 27 is a schematic diagram of an artificial neural network chip configured as an information processing device according to an example of the disclosure.

In a specific example of the disclosure, as illustrated in FIG. 27, the operation unit of the chip may adopt a short-bit floating point data module for forward computation, including a floating point data statistical module, a short-bit floating point data conversion unit, and a short-bit floating point data operation module.

The floating point data statistical module is configured to perform statistical analysis on data of each type required by artificial neural network forward computation to obtain an EL.

The short-bit floating point data conversion unit is configured to implement conversion from a long-bit floating point data type to a short-bit floating point data type according to the EL obtained by the floating point data statistical module.

The short-bit floating point data operation module is configured to, after the floating point data conversion units adopts the short-bit floating point data type to represent all inputs, weights, and/or offset data required by the artificial neural network forward computation, execute the artificial neural network forward computation on short-bit floating point data.

As one alternative implementation, the floating point data statistical module is further configured to perform statistical analysis on the data of each type required by the artificial neural network forward computation to obtain exponential offset. The short-bit floating point data conversion unit is configured to implement conversion from the long-bit floating point data type to the short-bit floating point data type according to the exponential offset and the EL obtained by the floating point data statistical module. The exponential offset and the EL are set, so that a representable data range may be extended as much as possible. Therefore, all data of the input neuron and the weight may be included.

Figure 28:
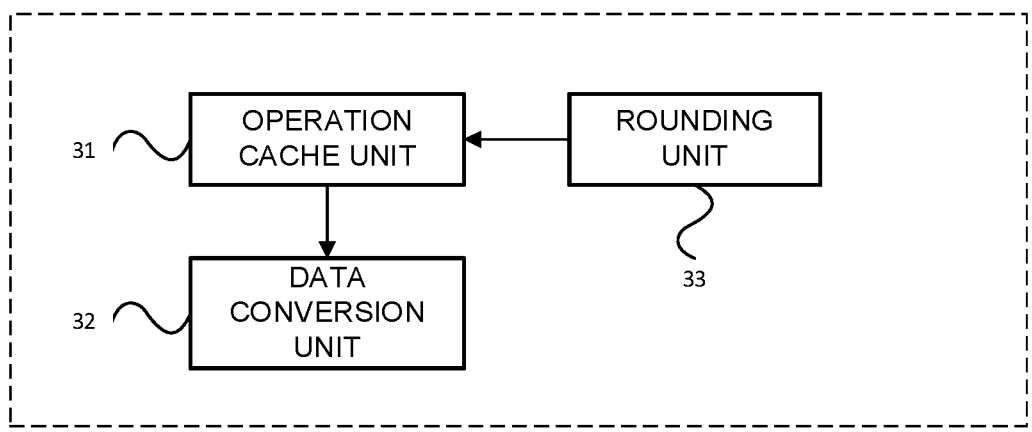
FIG. 28 is a functional module diagram of a short-bit floating point data conversion unit according to an example of the disclosure.

More specifically, as illustrated in FIG. 28, the short-bit floating point data conversion unit may include an operation cache unit 31, a data conversion unit 32, and a rounding unit 33.

The operation cache unit adopts a data type with relatively high accuracy to store an intermediate result of the forward computation. This is because addition or multiplication computation may extend the data range during the forward computation. After computation is completed, a rounding operation is executed on data beyond a short-bit floating point accuracy range. Then, the data in a cache region is converted into the short-bit floating point data through the data conversion unit 32.

The rounding unit 33 may complete the rounding operation over the data beyond the short-bit floating point accuracy range. The unit may be a random rounding unit, a rounding-off unit, a rounding-up unit, a rounding-down unit, a truncation rounding unit and the like. Different rounding units may implement different rounding operations over the data beyond the short-bit floating point accuracy range.

The random rounding unit executes the following operation:

$$y = \begin{cases} \lfloor x \rfloor & w.p.\ 1 - \frac{x - \lfloor x \rfloor}{\varepsilon} \\ \lfloor x \rfloor + \varepsilon & w.p.\ \frac{x - \lfloor x \rfloor}{\varepsilon} \end{cases},$$

where y represents the short-bit floating point data obtained by random rounding; x represents 32-bit floating point data before random rounding; $\varepsilon$ is a minimum positive integer which may be represented by a present short-bit floating point data representation format, i.e., $2^{offset-(X-1-EL)}$; $\lfloor x \rfloor$ represents a number obtained by directly truncating the short-bit floating point data from raw data x (similar to a rounding-down operation over decimals); and w.p. represents a probability, that is, a probability that the data y obtained by random rounding is $\lfloor x \rfloor$ is $$1 - \frac{x - \lfloor x \rfloor}{\varepsilon}$$

and a probability that the data y obtained by random rounding is $\lfloor x \rfloor + \varepsilon$ is $$\frac{x - \lfloor x \rfloor}{\varepsilon}.$$

The rounding-off unit executes the following operation:

$$y = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases},$$

where y represents the short-bit floating point data obtained by rounding-off; x represents the long-bit floating point data before rounding-off; $\varepsilon$ is the minimum positive integer which may be represented by the present short-bit floating point data representation format, i.e., $2^{offset-(X-1-EL)}$; $\lfloor x \rfloor$ is an integral multiple of $\varepsilon$; and a value of $\lfloor x \rfloor$ is a maximum number less than or equal to x.

The rounding-up unit executes the following operation:

$$y = \lceil x \rceil,$$

where y represents the short-bit floating point data obtained by rounding-up; x represents the long-bit floating point data before rounding-up; $\lceil x \rceil$ is the integral multiple of $\varepsilon$; a value of $\lceil x \rceil$ is a minimum number greater than or equal to x; and $\varepsilon$ is the minimum positive integer which may be represented by the present short-bit floating point data representation format, i.e., $2^{offset-(X-1-EL)}$.

The rounding-down unit executes the following operation:

$$y = \lfloor x \rfloor,$$

where y represents the short-bit floating point data obtained by rounding-up; x represents the long-bit floating point data before rounding-up; $\lfloor x \rfloor$ is the integral multiple of $\varepsilon$; a value of $\lceil x \rceil$ is a maximum number less than or equal to x; and $\varepsilon$ is the minimum positive integer which may be represented by the present short-bit floating point data representation format, i.e., $2^{offset-(X-1-EL)}$.

The truncation rounding unit executes the following operation:

$$y=[x],$$

where y represents the short-bit floating point data after truncation rounding; x represents the long-bit floating point data before truncation rounding; and [x] represents the number obtained by directly truncating the short-bit floating point data from the raw data x.

In addition, the artificial neural network chip may be applied to a terminal. The terminal may further include an image acquisition device, besides the artificial neural network chip. The image acquisition device may be a webcam and a camera. The terminal may be a desktop computer, smart home, a transportation means, or a portable electronic device. The portable electronic device may be a webcam, a mobile phone, a notebook computer, a tablet computer, a wearable device, and the like. The wearable device may include a smart watch, a smart band, smart clothes, and the like. The artificial neural network chip may also be applied to a cloud (server). Then only one application (APP) is required on a device of a user. The device uploads an acquired image, the information processing device of the disclosure calculates an output, and a user terminal makes a response.

In addition, the disclosure further provides an information processing method, which may include the following steps.

A storage unit receives input data, the input data including one or more images.

A data processing unit extracts and processes a key feature included in the input data and generates a multidimensional vector for each image according to a processing result.

The key feature may include a facial action and expression, a key point position, and the like in the image. A specific form is an FM in a neural network. The image may include a static picture, pictures forming a video, a video, or the like. The static picture, the pictures forming the video, or the video may include images of one or more parts of a face. The one or more parts of the face include facial muscles, lips, eyes, eyebrows, nose, forehead, ears, and combination thereof of the face.

Each element of the multidimensional vector represents an emotion on the face, for example, anger, delight, pain, depression, sleepiness, and doubt. Furthermore, the information processing method may further include that: tagged data (existing image corresponding to the multidimensional vector) is learned; the multidimensional vector is output after the tagged data is learned; and a parameter of the data processing unit is updated.

Furthermore, the information processing method may further include that: the multidimensional vector is converted into a corresponding output. The output may be a control instruction, data (0, 1 output), a tag (happiness, depression, and the like), and picture output.

The control instruction may be single click, double click, and dragging of a mouse, single touch, multi-touch, and sliding of a touch screen, turning on and turning off of a switch, a shortcut key, and the like.

As one alternative implementation, the information processing method may further include that: adaptive training is performed. A specific flow is as follows.

n images are input into the storage unit, each image including a tag, each image corresponding to a vector (real emotion vector) and n being a positive integer greater than or equal to one.

The data processing unit takes calibrated data as an input, calculates an output emotion vector, i.e., a predicted emotion vector, in a format the same as the input, compares the output emotion vector with the real emotion vector and updates a parameter of the device according to a comparison result.

The emotion vector may include n elements. A value of each element of the emotion vector may include the following conditions.

(1) The value of each element of the emotion vector may be a natural number between zero and one (representing a probability of appearance of a certain emotion).

(2) The value of each element of the emotion vector may also be any number greater than or equal to zero (representing an intensity of a certain emotion). For example, a preset expression is [delight, sadness, fear], and a vector corresponding to a reluctant smiling face may be [0.5, 0.2, 0].

(3) A value of only one element of the emotion vector is one and values of the other elements are zero. Under this condition, the emotion vector may only represent a strongest emotion. For example, a preset expression is [delight, sadness, fear], and a vector corresponding to an obvious smiling face may be [1, 0, 0].

The predicted emotion vector may be compared with the real emotion vector in manners of calculating a Euclidean distance, calculating an absolute of dot product of the predicted emotion vector and the real emotion vector, and the like. For example, n is three; the predicted emotion vector is $[a_1,a_2,a_3]$; the real emotion vector is $[b_1,b_2,b_3]$; the Euclidean distance of the two is $[(a_1-b_1)^2+(a_2-b_2)^2+(a_3-b_3)^2]^{1/2}$; and the absolute value of the dot product of the two is $|a_1*b_1+a_2*b_2+a_3*b_3|$. Those skilled in the art may understand that the comparison manners are not limited to calculating the Euclidean distance and calculating the absolute value of the dot product, and other methods may also be adopted.

As one alternative implementation, the information processing device is an artificial neural network chip. The value of each element of the emotion vector may be a number between zero and one (representing the probability of appearance of a certain emotion). Since emotions of a person may be overlaid, there may be multiple nonzero numbers in the emotion vector to express a complicated emotion.

In a specific example of the disclosure, a method by which the artificial neural network chip obtains the emotion vector may include that: each neuron of a final output layer of the neural network corresponds to an element of the emotion vector, and an output neuron value is a number between zero and one and is determined as a probability of appearance of the corresponding emotion. The whole process for calculating the emotion vector is as follows.

In S1, input data is transmitted into the storage unit through the preprocessing unit or is directly transmitted into the storage unit.

In S2, a DMA transmits the input data in batches to corresponding on-chip caches (i.e., an instruction cache, an input neuron cache, and a weight cache).

In S3, a control unit reads an instruction from the instruction cache and decodes and transmits the instruction into an operation unit.

In S4, the operation unit executes corresponding computation according to the instruction. In each layer of a neural network, computation is implemented mainly in three substeps. In S41, corresponding input neurons and weights are multiplied. In S42, adder tree computation is executed, that is, a result obtained in S41 is added through an adder tree step by step to obtain a weighted sum, and the weighted sum is offset or not processed according to a requirement. In S43, activation function computation is executed on a result obtained in S42 to obtain output neurons, and the output neurons are transmitted into an output neuron cache.

In S5, S2 to S4 are repeated until computation for all the data is completed, namely obtaining a final result required by a function. The final result is obtained by output neurons of the last layer of the neural network. Each neuron of the final output layer of the neural network corresponds to an element of the emotion vector, and an output neuron value is a number between zero and one and is determined as the probability of appearance of the corresponding emotion. The final result is output into the output neuron cache from the operation unit, and then is returned to the storage unit through the DMA.

According to the requirement of the function: a magnitude of the emotion vector (i.e., expression type, which is also the number of the neurons of the final output layer of the artificial neural network), a comparison form (the Euclidean distance, the dot product, and the like) with the real emotion vector of the training data, and a network parameter updating manner (stochastic gradient descent, Adam algorithm, and the like) are required to be preset in an adaptive training stage.

In some examples, a value of only one element of the emotion vector is one and values of the other elements are zero. Under this condition, the emotion vector may only represent the strongest emotion.

In a specific example of the disclosure, the method by which the artificial neural network chip obtains the emotion vector may include that: each neuron of the final output layer of the neural network corresponds to an element of the emotion vector, but only one output neuron is one and the other output neurons are zero. The whole process for calculating the emotion vector is as follows.

In S1, input data is transmitted into the storage unit through the preprocessing unit or is directly transmitted into the storage unit.

In S2, the DMA transmits the input data in batches to the instruction cache, the input neuron cache, and the weight cache.

In S3, the control unit reads the instruction from the instruction cache and decodes and transmits the instruction into the operation unit.

In S4, the operation unit executes corresponding computation according to the instruction. In each layer of the neural network, computation is implemented mainly in three substeps. In S41, corresponding input neurons and weights are multiplied. In S42, adder tree computation is executed, that is, a result obtained in S41 is added through an adder tree step by step to obtain a weighted sum, and the weighted sum is offset or not processed according to a requirement. In S43, activation function computation is executed on a result obtained in S42 to obtain output neurons, and the output neurons are transmitted into an output neuron cache.

In S5, S2 to S4 are repeated until computation for all the data is completed, namely obtaining a final result required by a function. The final result is obtained by the output neurons of the last layer of the neural network. Each neuron of the final output layer of the neural network corresponds to an element of the emotion vector, but only one output neuron is one and the other output neurons are zero. The final result is output into the output neuron cache from the operation unit, and then is returned to the storage unit through the DMA.

According to the requirement of the function: a magnitude of the emotion vector (i.e., expression type, which is also the number of the neurons of the final output layer of the artificial neural network), a comparison form (the Euclidean distance, the dot product, and the like) with the real emotion vector of the training data and a network parameter updating manner (stochastic gradient descent, Adam algorithm, and the like) are required to be preset in an adaptive training stage. In addition, the real emotion vector used for training in this example is different from example 1 and should also be an "indication" vector like [1,0,0,0, . . . ].

Each functional unit/module in the disclosure may be hardware. For example, the hardware may be a circuit, including a digital circuit, an analogue circuit, and the like. Physical implementation of a hardware structure may include, but is not limited to, a physical device, and the physical device may include, but is not limited to, a transistor, a memristor, and the like. The computation module in the computation device may be any proper hardware processor, for example, a CPU, a graphics processing unit (GPU), a field-programmable gate array (FPGA), a digital signal processor (DSP), and an application specific integrated circuit (ASIC). The storage unit may be any proper magnetic storage medium or magneto-optical storage medium, for example, a resistance random access memory (RRAM), a DRAM, an SRAM, an embedded DRAM (EDRAM), a high bandwidth memory (HBM), and a hybrid memory cube (HMC).

In addition, the neural network of the disclosure may be a convolutional neural network and may also be a fully connected neural network, a restricted Boltzmann machine (RBM) neural network, a recurrent neural network (RNN), and the like. In some other examples, computation may be other operations in the neural network besides convolutional computation, for example, fully connected computation.

Direction terms, for example, "upper", "lower", "front", "back", "left" and "right", mentioned in the following examples are only directions with reference to the drawings. Therefore, the direction terms are adopted to not limit but describe the disclosure.

Figure 29:
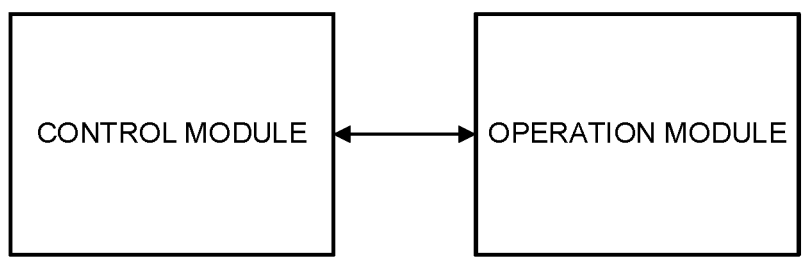
FIG. 29 is a functional module diagram of a computation device according to an example of the disclosure.

An example of the disclosure provides an online configurable neural network operation device, i.e., an online configurable neural network hardware processor. FIG. 29 is a functional module diagram of a computation device according to an example of the disclosure. As illustrated in FIG. 29, the neural network operation device of the disclosure may include a control module and an operation module, and may further include a storage module.

The operation module may include multiple operation units. Each operation unit may include at least one multiplier and at least one adder. In some examples, each operation unit may further include at least one memory. The memory may include a storage space and/or a temporary cache. The storage space is, for example, an SRAM. The temporary cache is, for example, a register.

The control module is configured to send an instruction to the multiple operation units and control data transmit between the operation units.

The instruction may be configured for each operation unit to transmit data to be computed or an intermediate result value to one or more other operation units in one or more directions. The transmit directions include transmit to the left/right adjacent or nonadjacent operation units, transmit to the upper/lower adjacent or nonadjacent operation units, transmit to the diagonally adjacent or nonadjacent operation units, and transmit to multiple adjacent or nonadjacent operation units in multiple directions. The direction of transmit to the diagonally adjacent or nonadjacent operation units may include a direction of transmit to the left upper diagonally, left lower diagonally, right upper diagonally, and right lower diagonally adjacent or nonadjacent operation units.

Each operation unit is provided with multiple input ports. The multiple input ports include a port connected with the storage module and configured to receive data transmitted by the storage module and a port connected with the other operation units and configured to receive data transmitted by the operation units. Each operation unit is also provided with an output port configured to transmit the data back to the storage module or to a specified operation unit.

The storage module may include a data storage unit and/or a temporary cache. According to a requirement, one or more data storage units and/or temporary caches may be provided. That is, the data to be computed may be stored in the same region and may also be stored separately. An intermediate result may be stored in the same region and may also be stored separately. The data storage unit is, for example, an SRAM. The temporary cache is, for example, a register.

Figure 30:
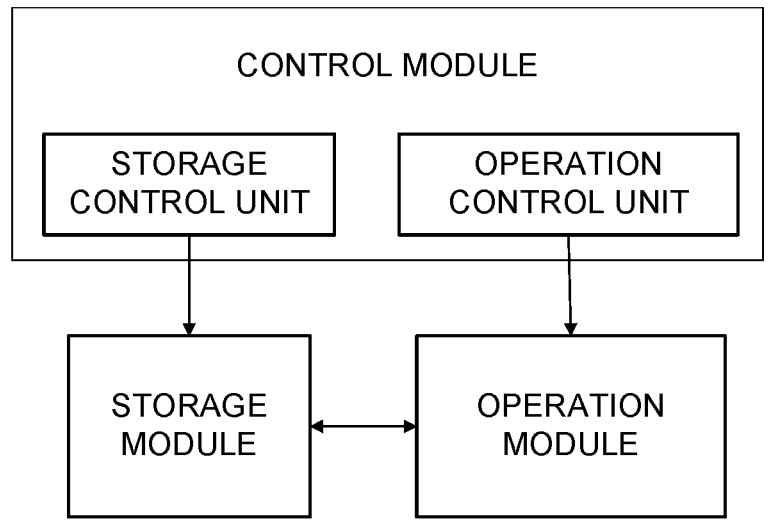
FIG. 30 is a functional module diagram of a computation device according to an example of the disclosure.

As one alternative example, as illustrated in FIG. 30, the control module may include a storage control unit and a computational control unit. The storage control unit is configured to control the storage module to store or read required data. The computational control unit is configured to control the operation module according to the type of computation to be executed and a computational requirement, including to control specific computation manners in the operation units and to control data transmit between the operation units.

The disclosure further provides a computation method, which may include the following steps.

A control module sends an instruction.

Multiple operation units of an operation module receive the instruction and perform data transmit according to the instruction.

Each operation unit receives the instruction and transmits data to be computed or an intermediate result to the other operation units except itself in one or more directions according to the instruction.

The direction may include a direction of transmit to the left/right adjacent or nonadjacent operation units, a direction of transmit to the upper/lower adjacent or nonadjacent operation units, and a direction of transmit to diagonally adjacent or nonadjacent operation units.

The direction of transmit to the diagonally adjacent or nonadjacent operation units may include a direction of transmit to the left upper diagonally, left lower diagonally, right upper diagonally, and right lower diagonally adjacent or nonadjacent operation units.

Figure 31:
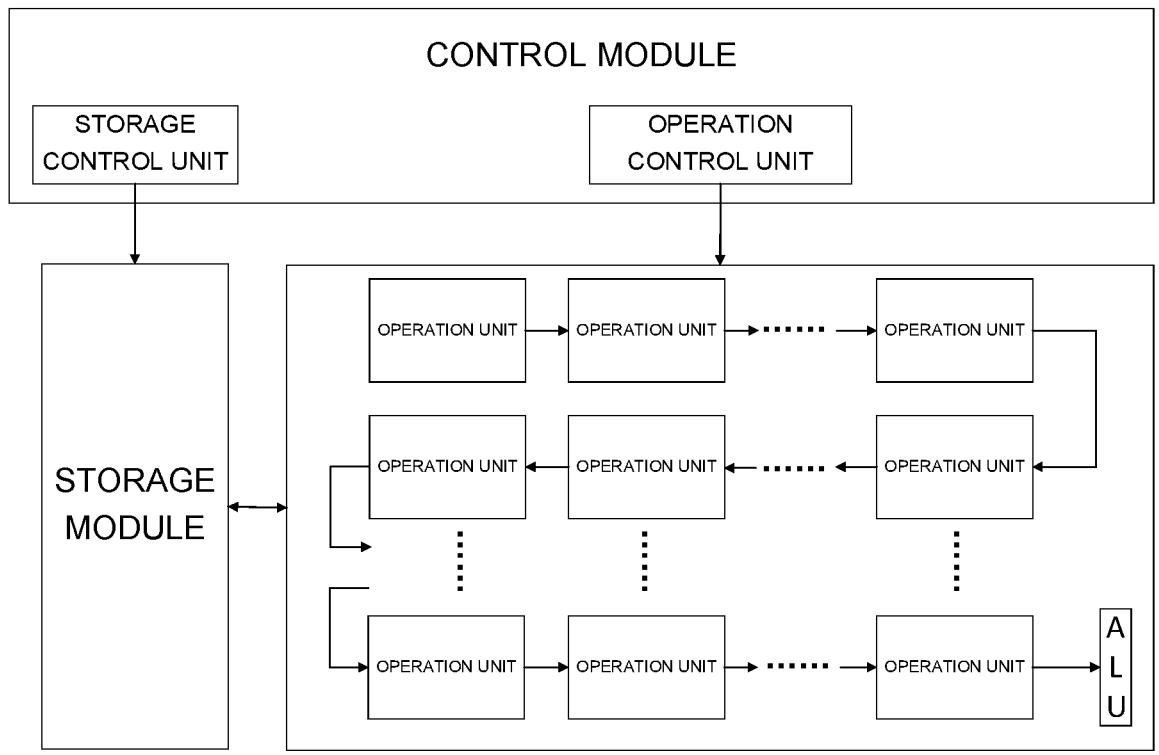
FIG. 31 is a functional module diagram of a computation device according to an example of the disclosure.

In a specific example of the disclosure, the operation module may include N*N (N is a positive integer) operation units and an ALU. The data may be transmitted sequentially in an S-shaped direction, as illustrated in FIG. 31. As one alternative implementation, the ALU is a lightweight ALU. Each operation unit may include a multiplier, an adder, a storage space, and a temporary cache. The intermediate results obtained by every computation executed by the operation units are transmitted between the operation units.

A main computation flow of a processor of the example is as follows. A storage control unit sends a read control signal to a storage module to read neuron data and synaptic weight data to be computed, and store neuron data and synaptic weight data to be computed in the storage spaces of the operation units for transmit respectively. A computational control unit sends a computational signal to be computed to each operation unit and initializes each operation unit, for example, clearing caches. The storage control unit sends an instruction and transmits a neuron to be computed to each operation unit. The computational control unit sends an instruction and each operation unit receives neuron data for multiplication with the corresponding synaptic weight data in its own storage space. A left upper operation unit transmits a computational result rightwards to a second operation unit, and the second operation unit adds the computational result received and a computational product obtained by itself to obtain a partial sum and transmits the partial sum rightwards, and so on. As illustrated in FIG. 31, the partial sum is transmitted according to an S-shaped path and is continuously accumulated. If accumulation is completed, the partial sum is transmitted into the ALU for computation such as activation and then a result is written into the storage module. If not, the result is temporally stored back into the storage module for subsequent scheduling and computation is continued. By such a structure, every time when computation is executed, a characteristic of weight sharing of the neural network is fully utilized, and the weight data is only required to be loaded once at the very beginning, so that the number of memory access times is greatly reduced, and a power consumption overhead is reduced.

Figure 32:
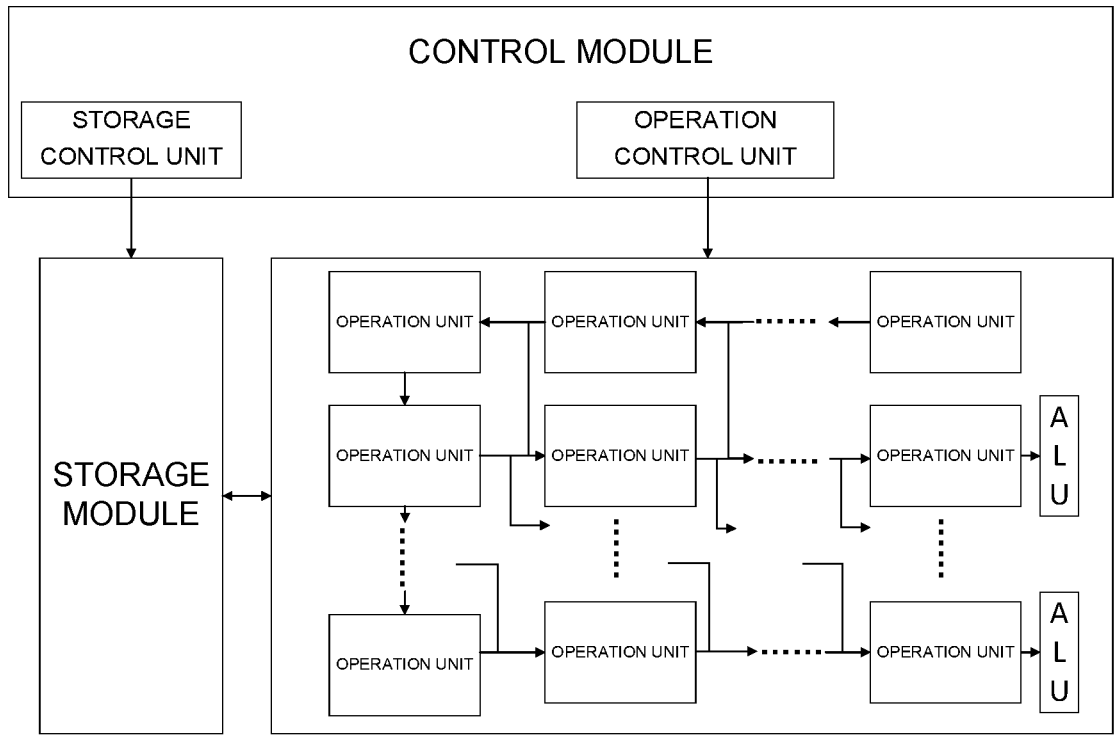
FIG. 32 is a functional module diagram of a computation device according to an example of the disclosure.

In a specific example of the disclosure, as illustrated in FIG. 32, the operation module may include N*N (N is a positive integer) operation units and M=1 ALUs (M is a positive integer). As one alternative implementation, M=N. Different operation units may transmit computational data in different directions. That is, there is no such requirement that all the operation units in the same operation module keep a unified transmit direction. Each operation unit may include a multiplier, an adder, and a temporary cache. The intermediate results obtained by every computation executed by the operation units are transmitted between the operation units. As one alternative implementation, the ALUs are lightweight ALUs.

An output value of an LRN layer is $(1+(\alpha/n) \Sigma_i x_1^2)^\beta$. When the LRN layer is calculated, accumulation of a square of input data may be completed through the operation units and then a subsequent exponential operation is completed through the ALU. Here, operations and data transmit direction of the operation units are configured as follows. The operation units in the leftmost column are configured to receive data to be computed from the storage module, to complete square operations, and to transmit square values to the right and right lower adjacent operation units. The operation units in the uppermost column are configured to receive the data from the storage module, to complete square operations, and to transmit square values to the right lower adjacent operation units. The operation units in the rightmost column are configured to receive the data from operation units of the left upper and the left, to complete accumulation and, if all accumulation is completed, to transmit the data rightwards to the ALU for subsequent exponential operations according to the instruction. The other operation units are configured to receive the data from the left upper operation units, to transmit the data to the right lower operation units, and to accumulate the data and data transmitted by the left operation units and transmit an accumulated sum rightwards. The rest may be done in the same manner until all computation is completed.

Figure 33:
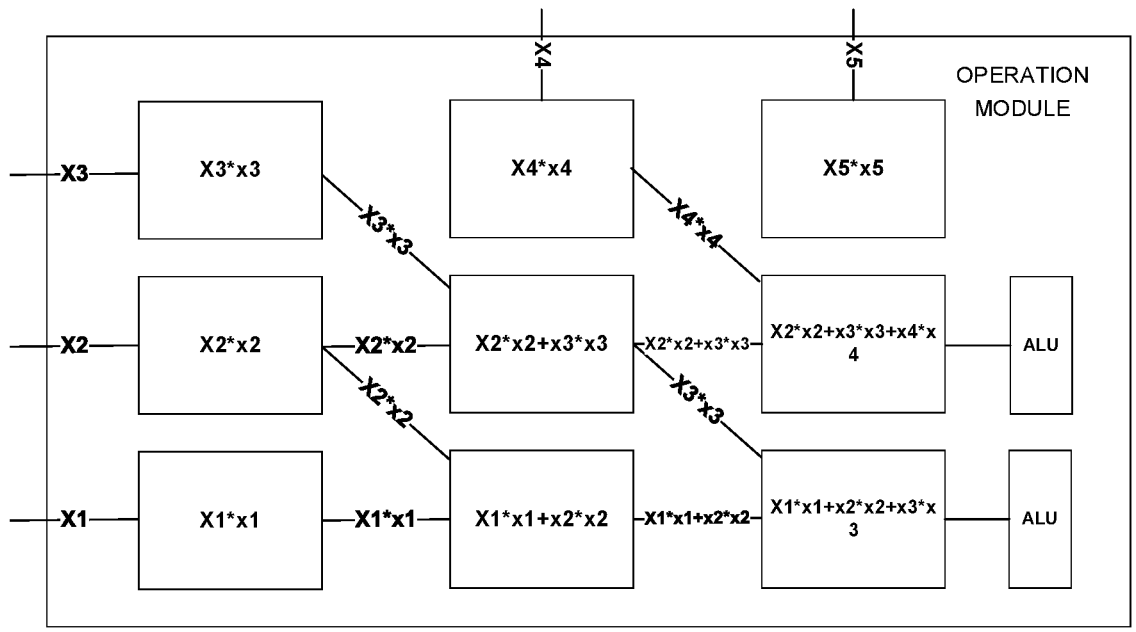
FIG. 33 is a schematic diagram of an operation module according to an example of the disclosure.

Specific descriptions will be made below with N=3 as an example. As illustrated in FIG. 33, data on the horizontal lines is specific data to be transmitted and data in boxes represent computational results obtained in each operation unit. In this process, related operations may be completed in a pipeline manner. By adopting the processor of the disclosure, data which has been read on the chip may be effectively utilized; the number of memory access times is effectively reduced; a power consumption overhead is reduced; a delay brought by data reading is reduced; and a computational speed is increased.

Each functional unit/module in the disclosure may be hardware. For example, the hardware may be a circuit, including a digital circuit, an analogue circuit, and the like. Physical implementation of a hardware structure may include, but is not limited to, a physical device, and the physical device may include, but is not limited to, a transistor, a memristor, and the like. The computation module in the computation device may be any proper hardware processor, for example, a CPU, a GPU, an FPGA, a DSP, and an ASIC. The storage unit may be any proper magnetic storage medium or magneto-optical storage medium, for example, an RRAM, a DRAM, an SRAM, an EDRAM, an HBM, and an HMC.

In addition, the neural network of the disclosure may be a convolutional neural network and may also be a fully connected neural network, an RBM neural network, an RNN, and the like. In some other examples, computation may be other operations in the neural network besides convolutional computation, for example, fully connected computation.

The processes or methods described in the abovementioned drawings may be executed by processing logics including hardware (for example, a circuit and a dedicated logic), firmware, software (for example, software born on a non-transitory computer-readable medium), or a combination of two. Although the processes or methods have been described above according to some sequential operations, it should be understood that some described operations may be executed in different sequences. In addition, some operations may be executed not sequentially but concurrently.

So far, the examples of the disclosure have been described in combination with the drawings in detail. According to the above descriptions, those skilled in the art should have a clear understanding to the disclosure.

It should be noted that implementations which are not illustrated or described in the drawings or the specification are all forms known to those of ordinary skill in the art and are not described in detail. In addition, the above descriptions about each component are not limited to various specific structures and shapes mentioned in the examples. Those of ordinary skill in the art may make simple modifications or replacements. The disclosure may provide examples of parameters including specific values. However, these parameters are not required to be exactly equal to the corresponding values and, instead, may be approximate to the corresponding values within acceptable error tolerance or design constraints. The examples may be mixed and matched for use or mixed and matched with other examples for use on the basis of considerations about design and reliability. That is, technical features in different examples may be freely combined into more examples.

Purposes, technical solutions and beneficial effects of the disclosure are further described above with the specific examples in detail. It should be understood that the above is only the specific example of the disclosure and not intended to limit the disclosure. Any modifications, equivalent replacements, improvements and the like made within the spirit and principle of the disclosure shall fall within the scope of protection of the disclosure.

What is claimed is:

1. A data redundancy method comprising:
dividing data into one or more importance ranks;
extracting an important bit of each piece of data in each of the one or more importance ranks; and
performing data redundancy processing on the important bit,
wherein the dividing data into the M importance ranks includes dividing the data according to at least one of a size of the data, an absolute value of the data, a type of the data, a read operation frequency of the data, and a write operation frequency of the data, and
wherein the data includes neural network parameters, the importance ranks are divided according to absolute values of the neural network parameters, and multiple threshold values $T0, T1, T2, \ldots$, and $TM$ are set in a descending order, and when an absolute value D of a neural network parameter meets $Ti-1>D>Ti$, data corresponding to the neural network parameter is classified into the ith importance rank, wherein $i=1, 2, \ldots, M$, and $T0, T1, T2, \ldots$, and $TM$ are all real numbers, and $T0>T1>T2> \ldots >TM \geq 0$.

2. The data redundancy method of claim 1, wherein the data redundancy processing includes replica redundancy processing and/or error correcting code processing.

3. The data redundancy method of claim 2, wherein the performing error correcting code processing on data includes:
performing redundancy storage on the data in a CRC manner,
when a read operation is executed, reading a stored CRC code and performing a CRC code computation on raw data,
when two CRC codes are inconsistent, correcting the data according to the stored CRC code, and
when a write operation is executed, storing both of the raw data and the CRC code of the data.

4. The data redundancy method of claim 2, wherein the performing error correcting code processing on data includes:
performing redundancy storage on the data in a manner of ECC memory, and
when the read/write operation is executed, automatically performing ECC processing by the ECC memory.

5. The data redundancy method of claim 2,
wherein the replica redundancy processing includes simultaneously generating two or more replicas, and
wherein the performing replica redundancy processing on the important bits of data includes:
when a read operation is executed, for the important bits, simultaneously reading the raw data and the two or more replicas, in case of data inconsistency, determining the two or more replicas as finally read data, and simultaneously modifying inconsistent data, and
when a write operation is executed, for the important bits, simultaneously writing back to addresses of the two or more replicas, and ensuring that the data in the raw data is consistent with the two or more replicas.

6. The data redundancy method of claim 1, wherein the data includes sparse neural network parameters, and the sparse neural network parameters include nonzero parameters and nonzero parameter positions, the nonzero parameter positions are configured as a first importance rank, the nonzero parameters are divided into M−1 importance ranks according to absolute values of the parameters, and M threshold values T1, T2, . . . , and TM are set in the descending order, and when the absolute value D of the nonzero parameter meets Ti−1>D>Ti, the data is classified into the ith importance rank, wherein i=2, 3 . . . , and M, and T1, T2, . . . , and TM are all real numbers and T1>T2> . . . >TM≥0.

7. The data redundancy method of claim 1, wherein the data includes diagram computation application data which includes vertex data and side data, the vertex data is configured as a first importance rank, M−1 importance ranks are divided for the side data according to access frequencies, and M threshold values T1, T2, . . . , and TM are set in descending order, and when a access frequency F of side data meets Ti−1>F>Ti, the side data is classified into the ith importance rank, wherein i=2, 3 . . . , and M, and T1, T2, . . . , and TM−1 are all real numbers and T1>T2> . . . >TM≥0.

8. The data redundancy method of claim 1, wherein the extracting the important bits of each piece of data corresponding to each importance rank includes:
if the data is a floating point parameter, setting sign bit and first y bits of an exponent part and a base part as the important bits, wherein y is a positive integer; and/or
if the data is a fixed point parameter, setting sign bit and first z bits of a numerical part as the important bits, wherein z is a positive integer.

9. A data redundancy device, comprising:
an importance rank dividing unit configured to divide data into one or more importance ranks;
an important bit extraction unit configured to extract important bits of each piece of data in each of the one or more importance ranks; and
a data redundancy processing unit configured to perform data redundancy processing on the important bits,
wherein the dividing data into the M importance ranks includes dividing the data according to at least one of a size of the data, an absolute value of the data, a type of the data, a read operation frequency of the data, and a write operation frequency of the data, and
wherein the data includes neural network parameters, M importance ranks are divided according to absolute values of the neural network parameters, and M+1 threshold values T0, T1, T2, . . . , and TM are set in a descending order, and when an absolute value D of a neural network parameter meets Ti−1>D>Ti, data corresponding to the neural network parameter is classified into the ith importance rank, wherein i=1, 2, . . . , M, and T0, T1, T2, . . . , and TM are all real numbers, and T0>T1>T2> . . . TM≥0.

10. The data redundancy device of claim 9, wherein the data redundancy processing includes replica redundancy processing and/or error correcting code processing, and the data redundancy processing unit includes a redundancy storage unit and a read/write control unit, wherein the redundancy storage unit is configured to store redundant data and the read/write control unit is configured to read and/or write data.

11. The data redundancy device of claim 10, wherein the performing error correcting code processing on data includes: performing redundancy storage, by the redundancy storage unit, on the data in the CRC manner, when the read/write control unit performs a read operation, reading a stored CRC code and performing a CRC code computation on raw data, if two CRC codes are inconsistent, correcting the data according to the stored CRC code, and when the read/write control unit performs a write operation, storing both of the raw data and the CRC code of the data.

12. The data redundancy device of claim 10, wherein the performing error correcting code processing on data includes: performing redundancy storage on the data in a manner of ECC memory, and when the read/write operation is executed, automatically performing ECC processing by the ECC memory.

13. The data redundancy device of claim 10,
wherein the replica redundancy processing includes simultaneously generating two or more replicas, and
wherein the performing replica redundancy processing on the important bits of data includes:
when a read operation is executed, for the important bits, simultaneously reading the raw data and N backed-up data, in case of data inconsistency, determining the two or more replicas as finally read data, and simultaneously modifying inconsistent data, and when a write operation is executed, for the important bits, simultaneously writing back to addresses of the two or more replicas, and ensuring that the data in the raw data is consistent with the two or more replicas.

14. The data redundancy device of claim 9, wherein the data includes sparse neural network parameters, and the sparse neural network parameters include nonzero parameters and nonzero parameter positions, the nonzero parameter positions are configured as a first importance rank, the nonzero parameters are divided into M−1 importance ranks according to absolute values of the parameters, and M threshold values T1, T2, . . . , and TM are set in the descending order, and when the absolute value D of the nonzero parameter meets Ti−1>D>Ti, the data is classified into the ith importance rank, wherein i=2, 3 . . . , and M, and T1, T2, . . . , and TM are all real numbers and T1>T2> . . . >TM≥0.

15. The data redundancy device of claim 9, wherein the data includes diagram computation application data which include vertex data and side data, the vertex data is configured as a first importance rank, M−1 importance ranks are divided for the side data according to access frequencies, and M threshold values T1, T2, . . . , and TM are set in descending order, and when a access frequency F of side data meets Ti−1>F>Ti, the side data is classified into the ith importance rank, wherein i=2, 3 . . . , and M, and T1, T2, . . . , and TM−1 are all real numbers and T1>T2> . . . TM≥0.

16. The data redundancy device of claim 9, wherein the extracting the important bits of each piece of data corresponding to each importance rank includes:
if the data is a floating point parameter, setting sign bit and first y bits of an exponent part and a base part as the important bits, wherein y is a positive integer; and/or
if the data is a fixed point parameter, setting sign bit and first z bits of a numerical part as the important bits, wherein z is a positive integer.

17. An electronic device, comprising:
a data redundancy device that includes:
an importance rank dividing unit configured to divide data into one or more importance ranks;
an important bit extraction unit configured to extract important bits of each piece of data in each of the one or more importance ranks; and
a data redundancy processing unit configured to perform data redundancy processing on the important bits,
wherein the dividing data into the M importance ranks includes dividing the data according to at least one of a size of the data, an absolute value of the data, a type of the data, a read operation frequency of the data, and a write operation frequency of the data, and wherein the data includes neural network parameters, M importance ranks are divided according to absolute values of the neural network parameters, and M+1 threshold values T0, T1, T2, ..., and TM are set in a descending order, and when an absolute value D of a neural network parameter meets $T_{i-1} > D > T_i$, data corresponding to the neural network parameter is classified into the ith importance rank, wherein i=1, 2, ..., M, and T0, T1, T2, ..., and TM are all real numbers, and $T0 > T1 > T2 > \ldots TM \geq 0$.

\* \* \* \* \*